(12) United States Patent
Kim

(10) Patent No.: US 9,944,262 B2
(45) Date of Patent: Apr. 17, 2018

(54) ELECTRIC BRAKE SYSTEM

(71) Applicant: MANDO CORPORATION, Gyeonggi-do (KR)

(72) Inventor: Hyun-Ho Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/261,870

(22) Filed: Sep. 9, 2016

(65) Prior Publication Data
US 2017/0072929 A1   Mar. 16, 2017

(30) Foreign Application Priority Data

Sep. 11, 2015   (KR) .......................... 10-2015-0128853

(51) Int. Cl.
| | |
|---|---|
| *B60T 11/20* | (2006.01) |
| *B60T 7/04* | (2006.01) |
| *B60T 11/22* | (2006.01) |
| *B60T 13/74* | (2006.01) |
| *B60T 8/40* | (2006.01) |
| *B60T 13/66* | (2006.01) |
| *B60T 13/68* | (2006.01) |

(52) U.S. Cl.
CPC .............. *B60T 11/20* (2013.01); *B60T 7/042* (2013.01); *B60T 8/409* (2013.01); *B60T 11/22* (2013.01);
(Continued)

(58) Field of Classification Search
CPC ...... B60T 7/042; B60T 8/4081; B60T 13/686; B60T 13/745; B60T 11/20
(Continued)

(56) References Cited

U.S. PATENT DOCUMENTS

| | | | |
|---|---|---|---|
| 9,656,651 B2 * | 5/2017 | Yang | ...................... B60T 13/686 |
| 2012/0112525 A1 * | 5/2012 | Shimada | ................. B60T 7/042 303/10 |

(Continued)

FOREIGN PATENT DOCUMENTS

| | | |
|---|---|---|
| EP | 2 520 473 | 11/2012 |
| JP | 2014-189134 | 10/2014 |
| JP | 2015-67233 | 4/2015 |

*Primary Examiner* — Christopher P Schwartz
(74) *Attorney, Agent, or Firm* — Ladas & Parry, LLP

(57) ABSTRACT

An electric brake system is disclosed. The electric brake system comprises a master cylinder connected to a first reservoir storing oil therein, provided with first and second chambers and first and second pistons respectively provided at the first and second chambers, and configured to discharge oil according to a pedal effort of a brake pedal; a simulation device configured to provide a reaction force according to the pedal effort of the brake pedal, and provided with a simulation chamber that is connected to the master cylinder and a simulation flow path to accommodate oil therein; a hydraulic pressure supply device configured to generate hydraulic pressure using a rotational force of a motor that is activated in response to an electrical signal output corresponding to a displacement of the brake pedal; and a hydraulic control unit configured to deliver the hydraulic pressure delivered from the hydraulic pressure supply device to a wheel cylinder provided at each of wheels, and connected to the first and second chambers of the master cylinder through first and second backup flow paths and connected to the hydraulic pressure supply device through a hydraulic flow path, wherein hydraulic pressure provided from the master cylinder is selectively delivered to the simulation flow path and the first and second backup flow paths.

12 Claims, 15 Drawing Sheets

(52) U.S. Cl.
CPC .......... *B60T 13/662* (2013.01); *B60T 13/686* (2013.01); *B60T 13/745* (2013.01); *B60T 8/4018* (2013.01); *B60T 8/4081* (2013.01); *B60T 2270/82* (2013.01)

(58) Field of Classification Search
USPC ....... 303/10, 11, 14, 16, 113.1–113.4, 114.1, 303/115.2, 116.2, 116.4
See application file for complete search history.

(56) References Cited

U.S. PATENT DOCUMENTS

| | | | |
|---|---|---|---|
| 2012/0306260 A1* | 12/2012 | Ohkubo | B60T 7/042 303/14 |
| 2014/0028083 A1* | 1/2014 | Gerdes | B60T 1/10 303/6.01 |
| 2015/0008727 A1* | 1/2015 | Kidera | B60T 8/885 303/16 |
| 2015/0183411 A1* | 7/2015 | Sakurazawa | B60T 8/4081 701/70 |
| 2016/0221560 A1* | 8/2016 | Yang | B60T 13/686 |
| 2017/0072919 A1* | 3/2017 | Jeon | B60T 8/4081 |
| 2017/0072927 A1* | 3/2017 | Jeon | B60T 11/20 |
| 2017/0072928 A1* | 3/2017 | Kim | B60T 8/4081 |
| 2017/0106843 A1* | 4/2017 | Jeong | B60T 7/042 |
| 2017/0106849 A1* | 4/2017 | Yun | B60T 8/368 |
| 2017/0144642 A1* | 5/2017 | Kim | B60T 7/042 |
| 2017/0144643 A1* | 5/2017 | Kim | B60T 7/042 |
| 2017/0144644 A1* | 5/2017 | Kim | B60T 13/146 |
| 2017/0158180 A1* | 6/2017 | Kim | B60T 7/042 |

* cited by examiner

[Fig. 1]
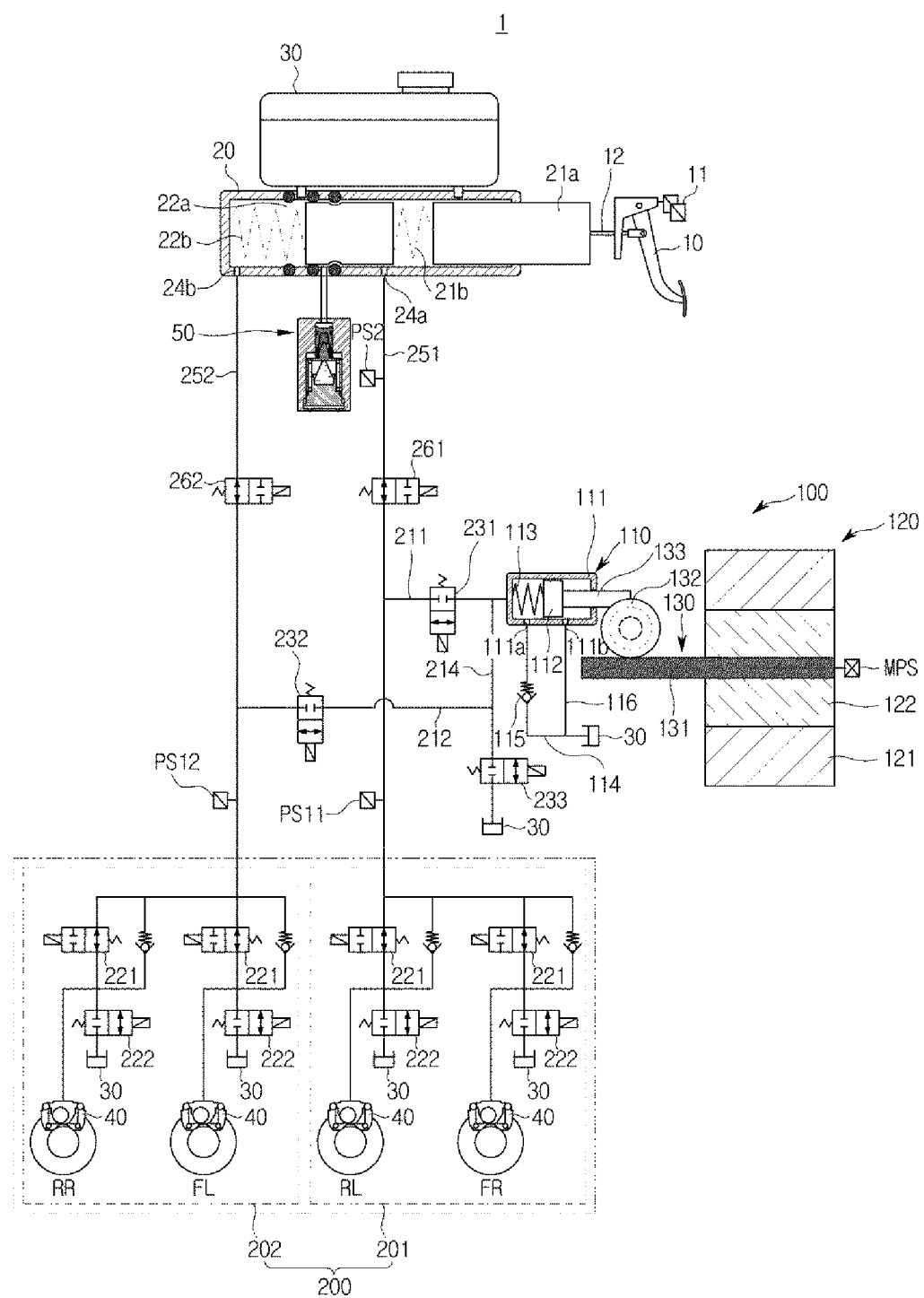

[Fig. 2]
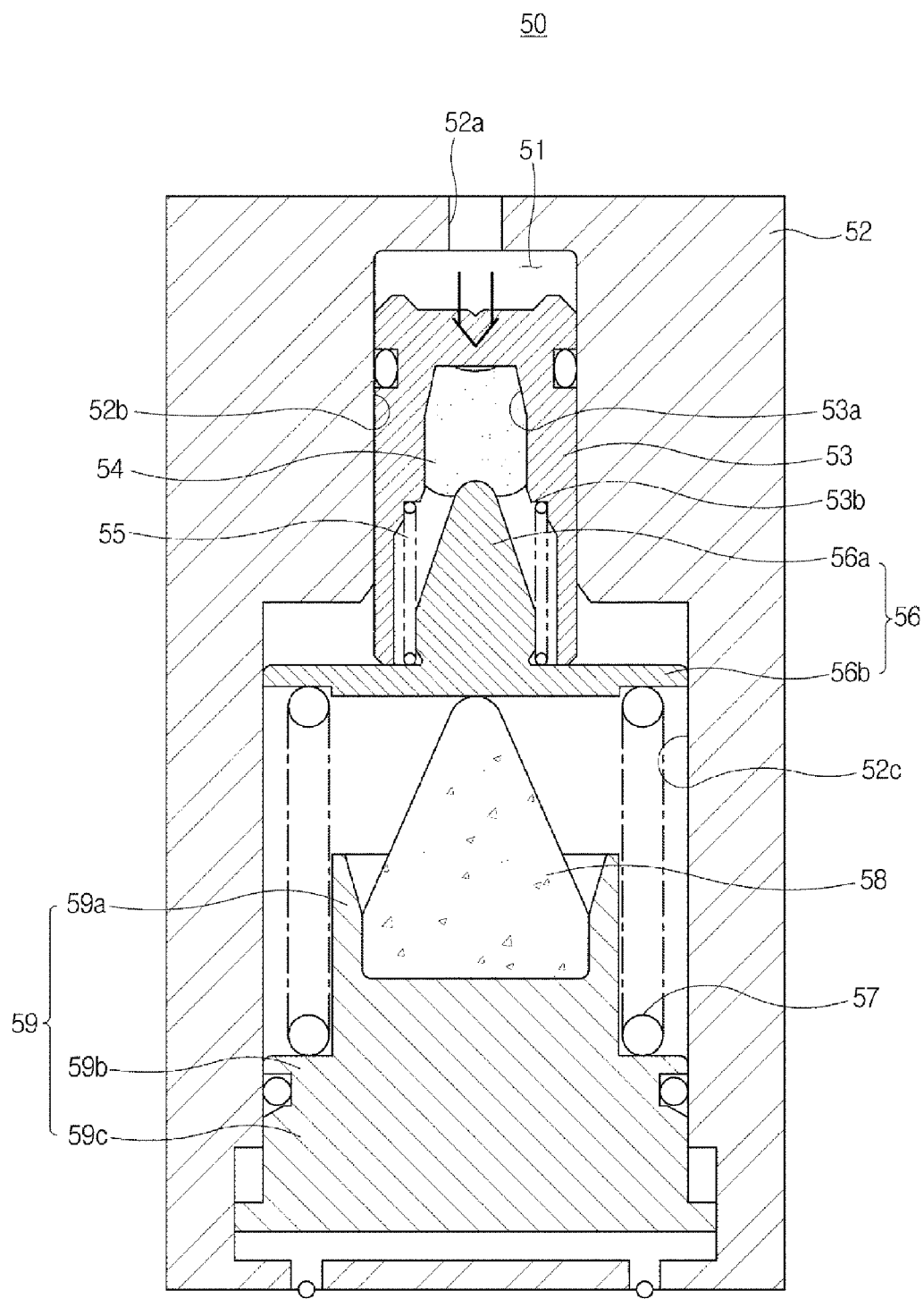

[Fig. 3]
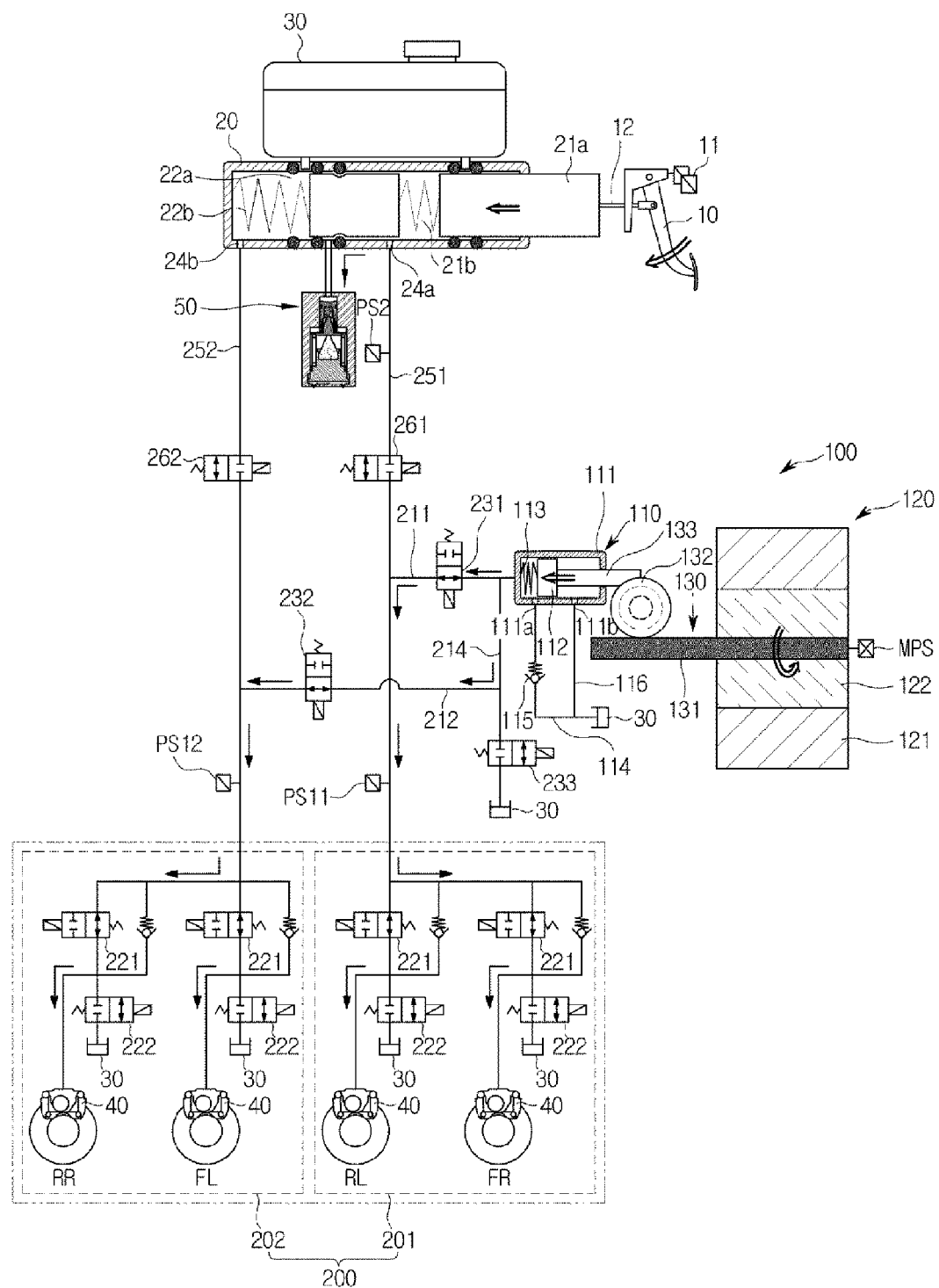

[Fig. 4]
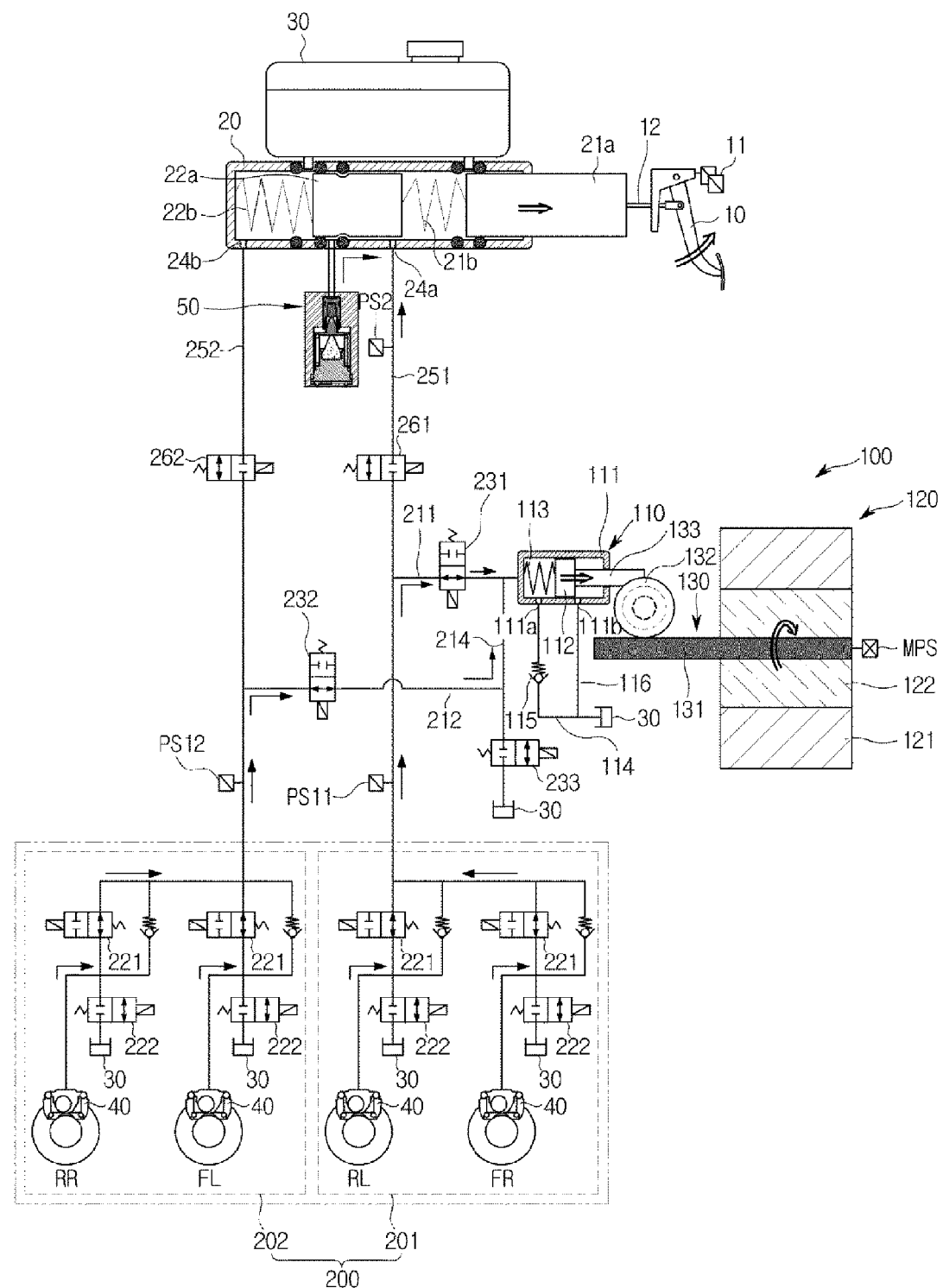

[Fig. 5]
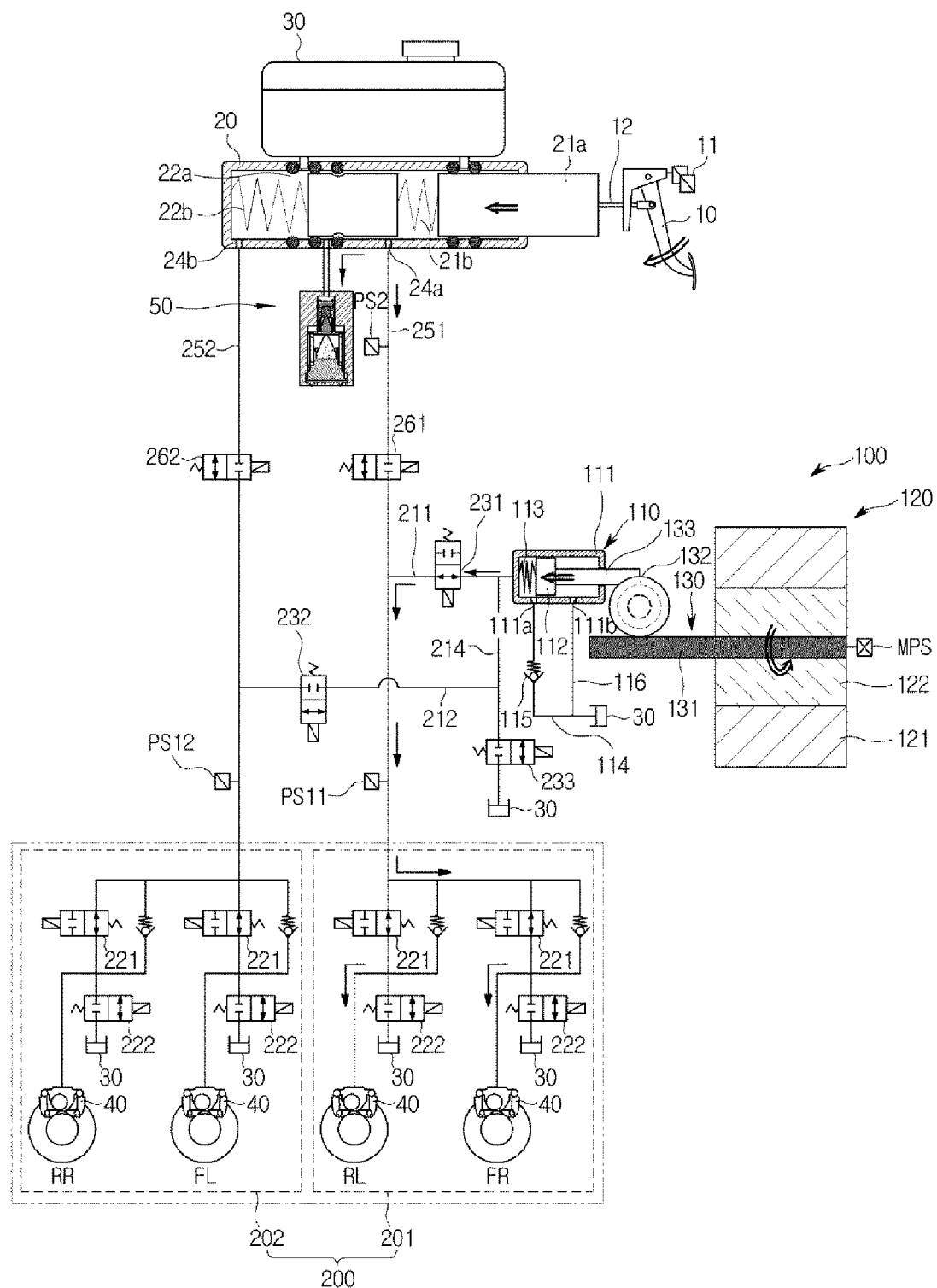

[Fig. 6]
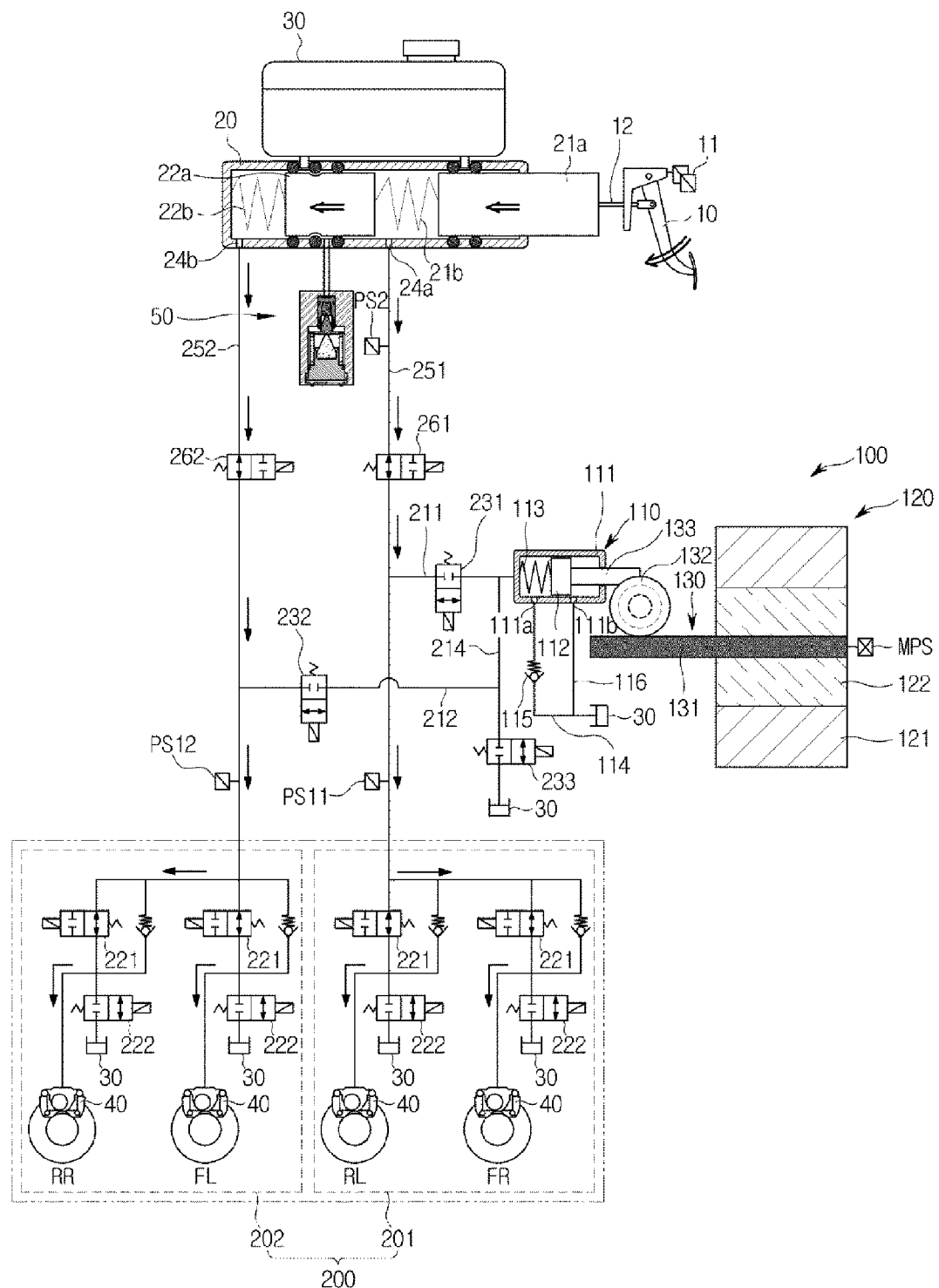

[Fig. 7]
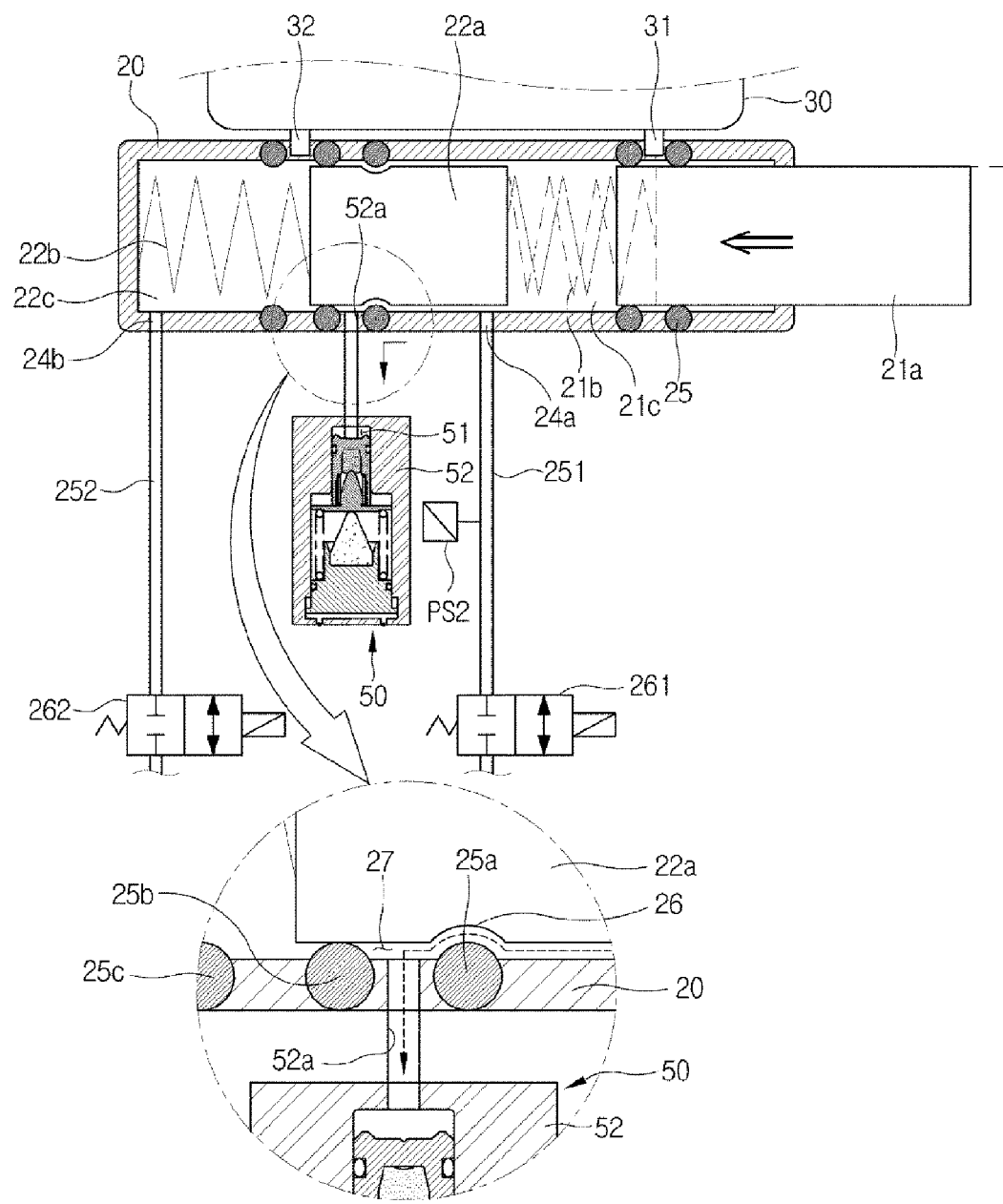

[Fig. 8]
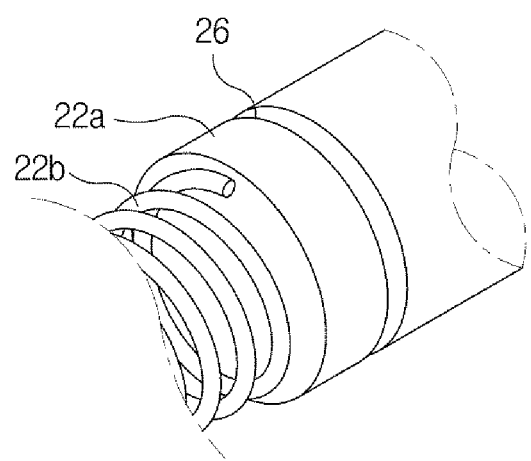

[Fig. 9]
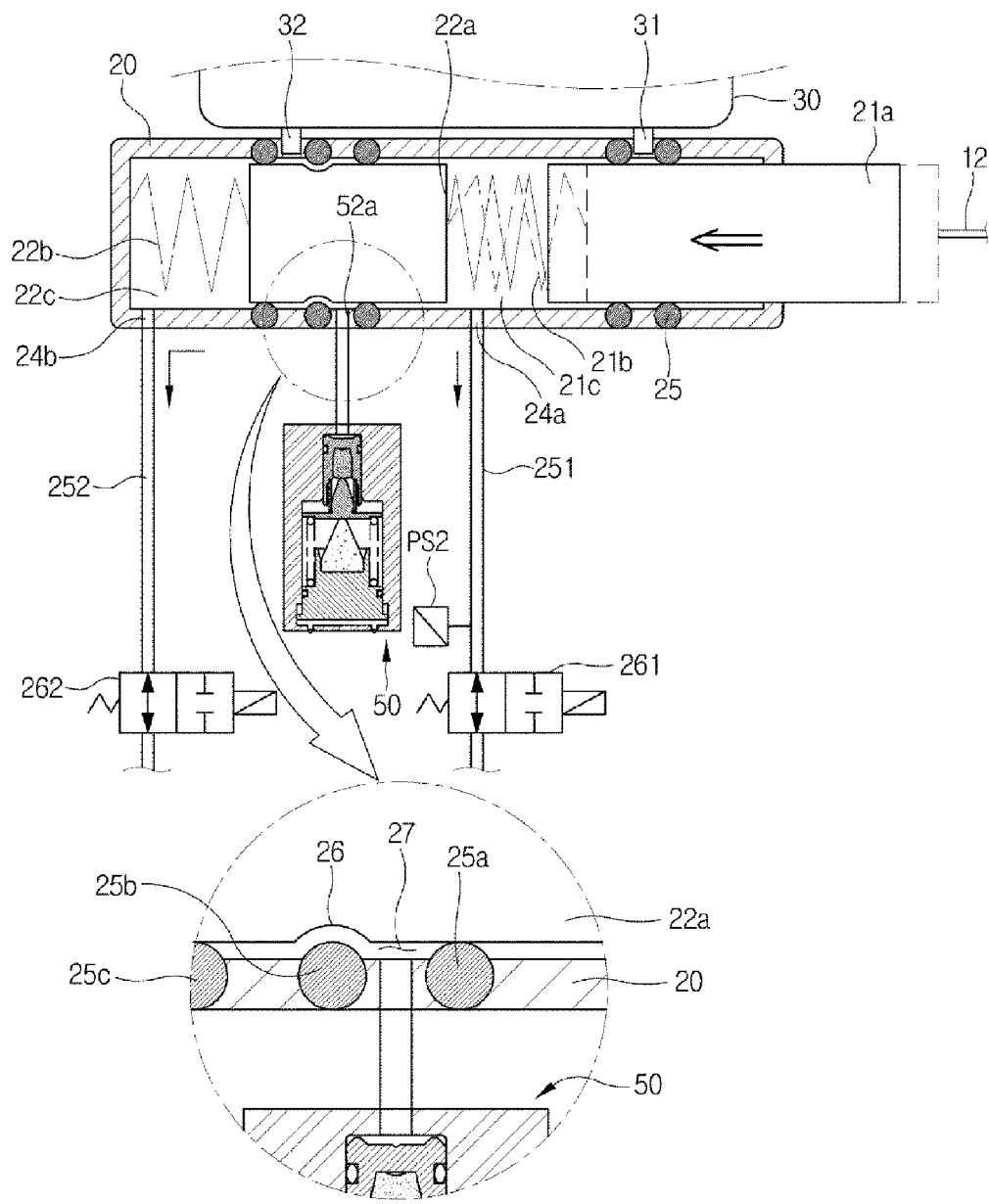

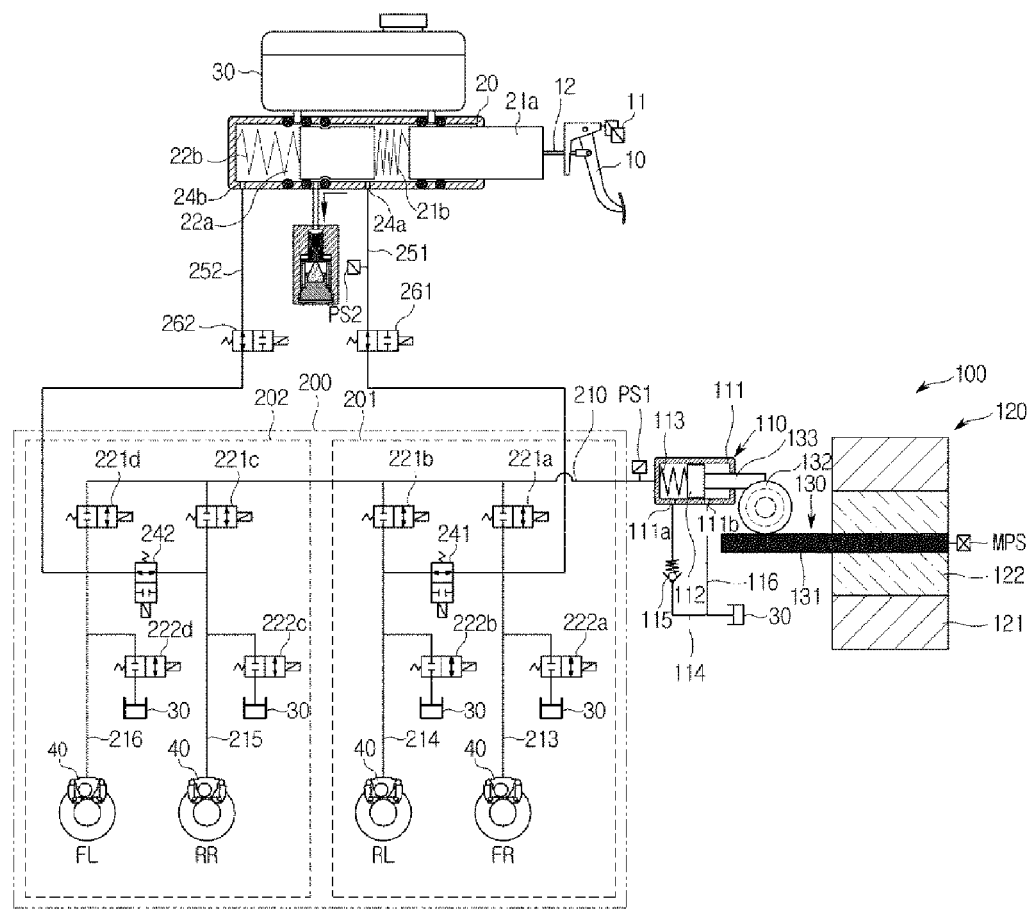
[Fig. 10]

[Fig. 11]
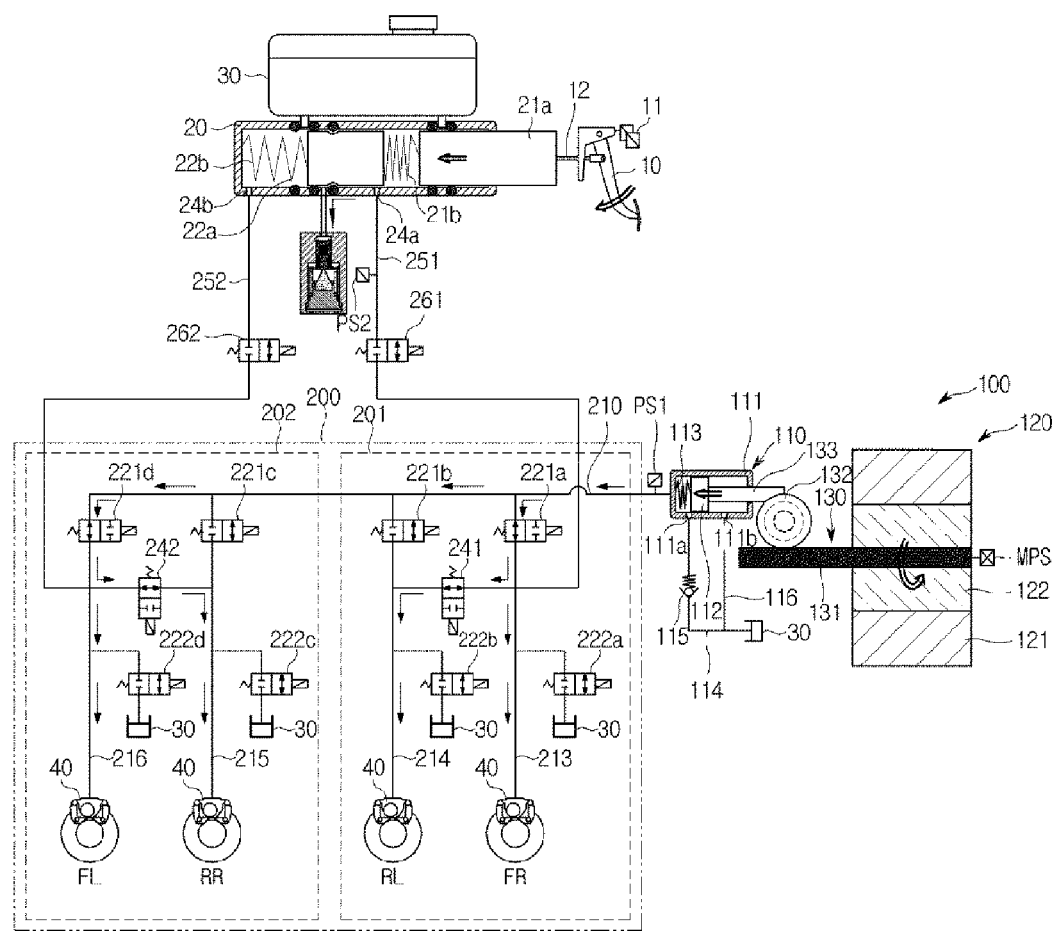

[Fig. 12]
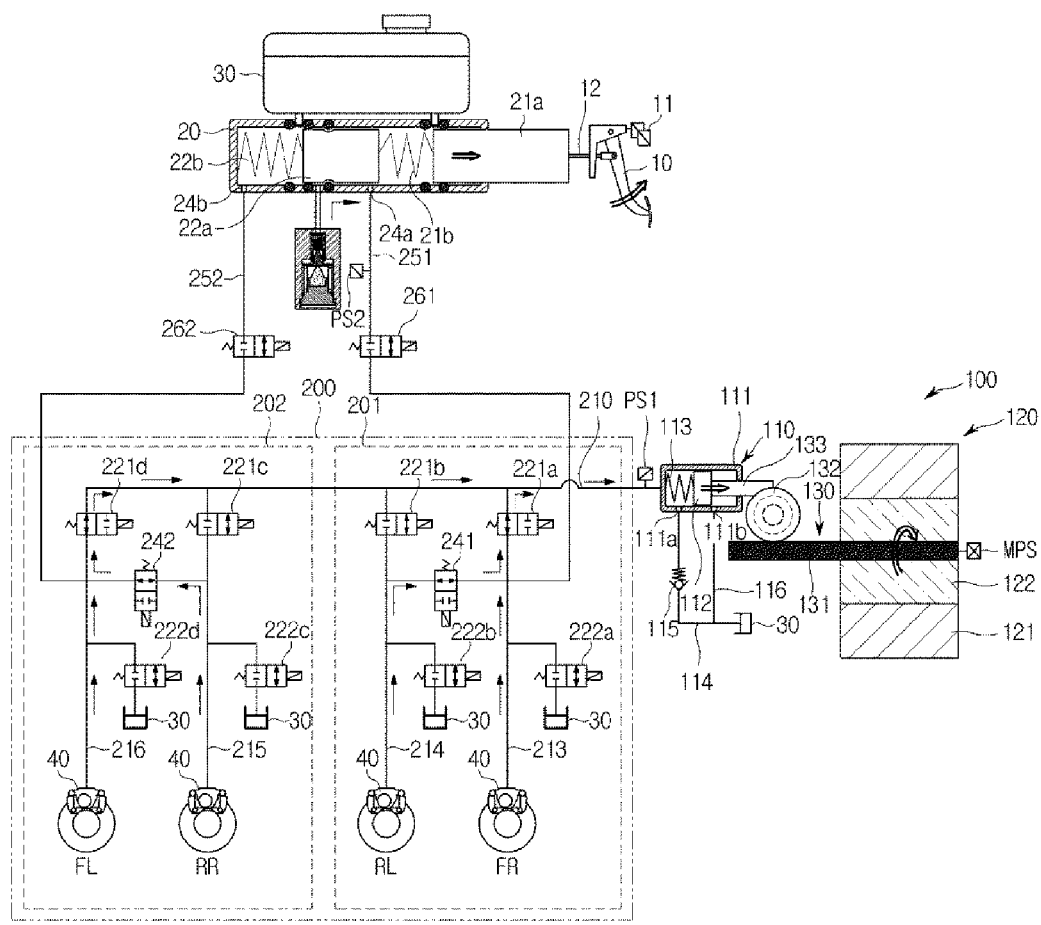

[Fig. 13]
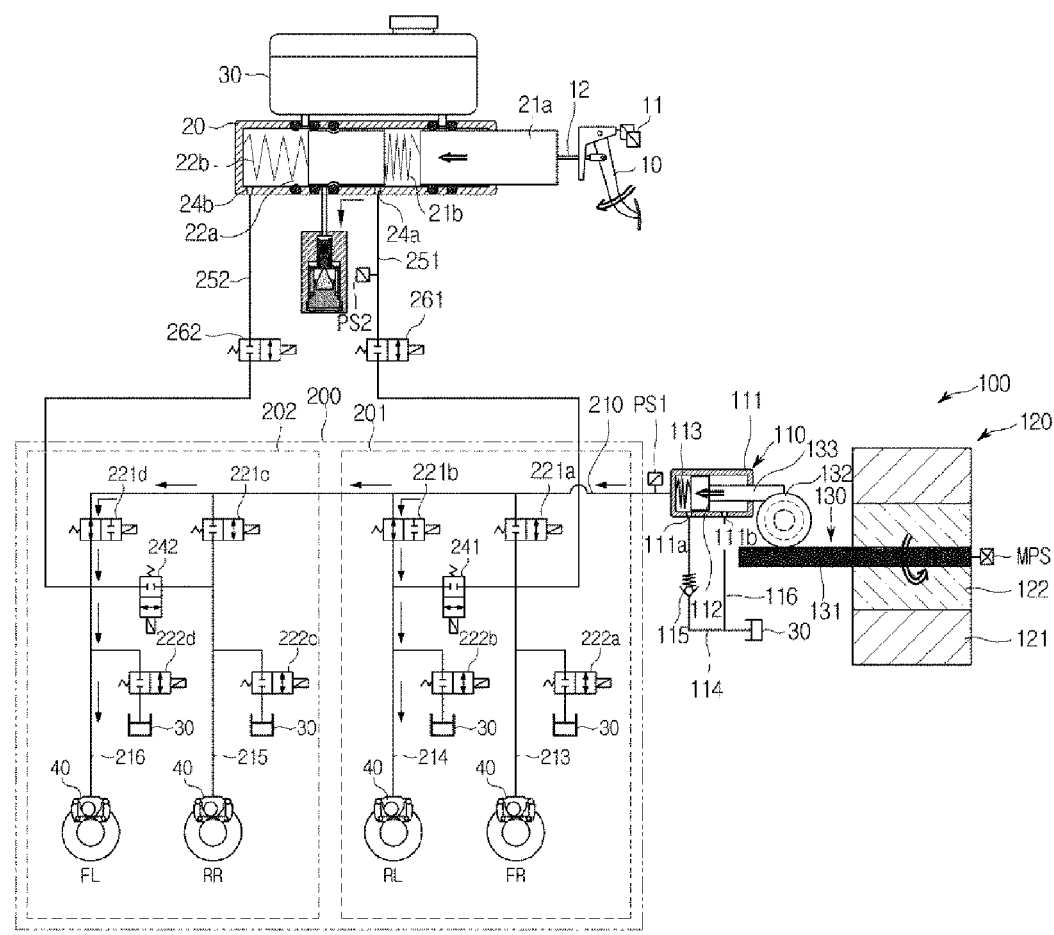

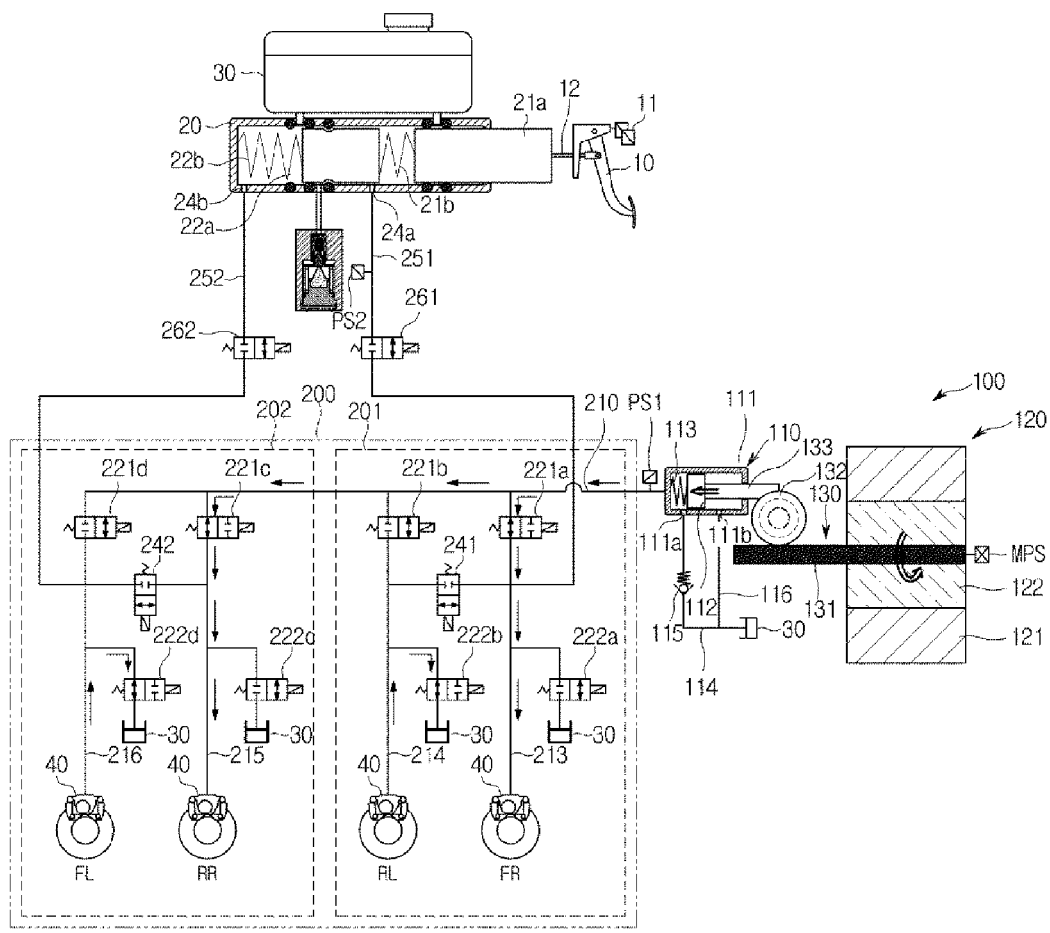
[Fig. 14]

[Fig. 15]
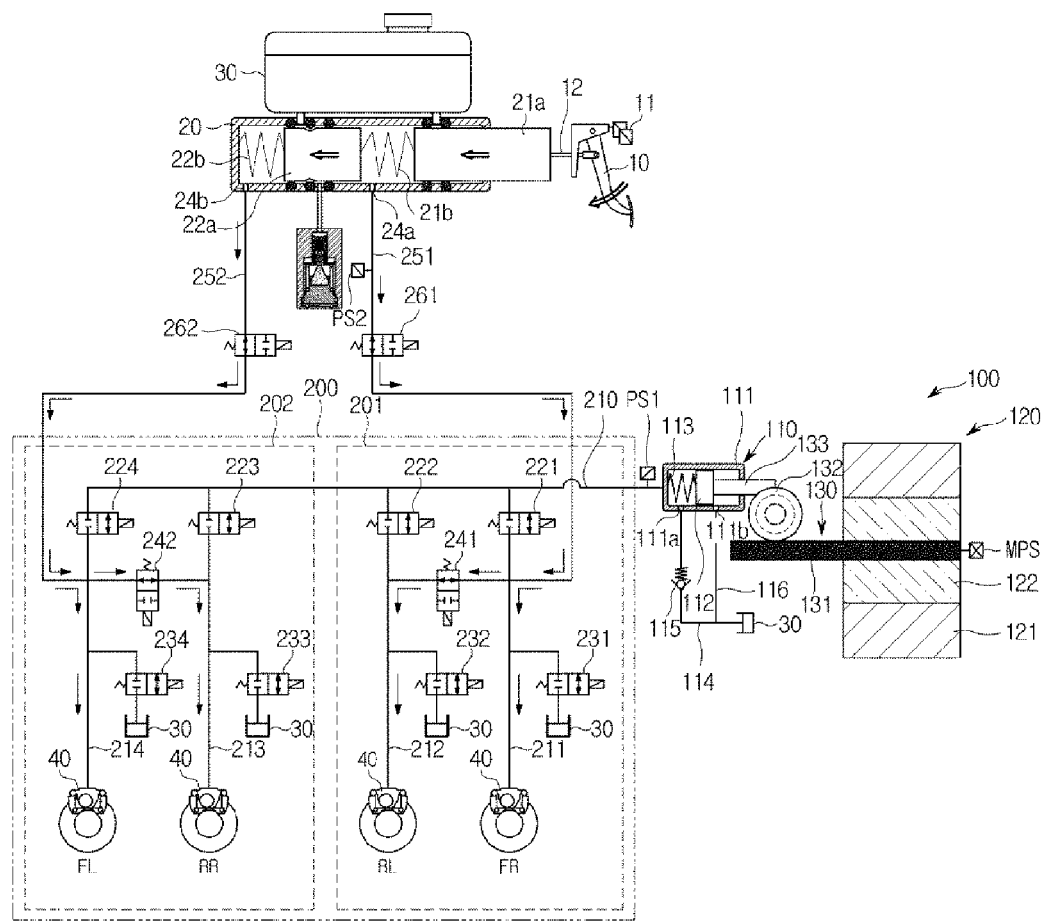

ELECTRIC BRAKE SYSTEM

This application claims the benefit of Korean Patent Application No. 2015-0128853, filed on Sep. 11, 2015 in the Korean Intellectual Property Office, the disclosure of which is incorporated herein by reference.

BACKGROUND

1. Field

Embodiments of the present disclosure relate to an electric brake system, and more particularly, to an electric brake system generating a braking force using an electrical signal corresponding to a displacement of a brake pedal.

2. Description of the Related Art

A brake system for braking is necessarily mounted on a vehicle, and a variety of systems for providing stronger and more stable braking have been proposed recently.

For example, there are brake systems including an antilock brake system (ABS) for preventing a wheel from sliding while braking, a brake traction control system (BTCS) for preventing a driving wheel from slipping when a vehicle is unintentionally or intentionally accelerated, an electronic stability control system (ESC) for stably maintaining a driving state of a vehicle by combining an ABS with traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor is activated according to a pedal effort of a brake pedal to generate braking pressure. At this point, the braking pressure is generated by converting a rotational force of the motor into a rectilinear movement to pressurize a piston.

Also, the electric brake system includes a simulation device capable of providing a driver with a reaction force according to the pedal effort of the brake pedal. At this point, the simulation device is connected to an oil reservoir, and a simulator valve is installed at an oil flow path which connects the simulation device to the oil reservoir.

Meanwhile, when hydraulic pressure is not generated by the hydraulic pressure supply device and hydraulic pressure, which is discharged from a master cylinder according to a pedal effort of the driver, is directly delivered to a wheel cylinder, the simulator valve is closed such that the hydraulic pressure delivered from the master cylinder is prevented from leaking.

However, when a leak occurs in the simulator valve, a dangerous situation may be caused by a braking force intended by the driver not being generated, and also production of high-quality products can be interrupted due to degradation of a feeling in terms of a pedal effort of braking.

PRIOR ART DOCUMENT (Patent Document) European Registered Patent No. EP 2 520 473 A1 (Honda Motor Co., Ltd.), Nov. 7, 2012.

SUMMARY

Therefore, it is an aspect of the present disclosure to provide an electric brake system capable of preventing hydraulic pressure discharged from a master cylinder from leaking and also providing a pedal feeling to a driver.

Additional aspects of the disclosure will be set forth in part in the description which follows and, in part, will be obvious from the description, or may be learned by practice of the disclosure.

In accordance with one aspect of the present invention, there is provided an electric brake system, which comprises a master cylinder connected to a first reservoir storing oil therein, provided with first and second chambers and first and second pistons respectively provided at the first and second chambers, and configured to discharge oil according to a pedal effort of a brake pedal; a simulation device configured to provide a reaction force according to the pedal effort of the brake pedal, and provided with a simulation chamber that is connected to the master cylinder and a simulation flow path to accommodate oil therein; a hydraulic pressure supply device configured to generate hydraulic pressure using a rotational force of a motor that is activated in response to an electrical signal output corresponding to a displacement of the brake pedal; and a hydraulic control unit configured to deliver the hydraulic pressure delivered from the hydraulic pressure supply device to a wheel cylinder provided at each of wheels, and connected to the first and second chambers of the master cylinder through first and second backup flow paths and connected to the hydraulic pressure supply device through a hydraulic flow path, wherein hydraulic pressure provided from the master cylinder is selectively delivered to the simulation flow path and the first and second backup flow paths.

Also, first and second hydraulic ports are formed at the master cylinder to connect the first and second chambers to the first and second backup flow paths, respectively, and the simulation flow path is located between the first and second hydraulic ports.

Also, the simulation flow path is connected the first chamber, and the oil flows through a gap between an inner wall of the master cylinder and an outer surface of the second piston.

Also, the master cylinder includes first and second sealing members located in front of and behind the simulation flow path and configured to seal oil of the first chamber and the second chamber, wherein a depression is formed at the outer surface of the second piston to provide a gap, through which the oil flows, between the first sealing member and the second piston.

Also, the electric brake system further comprises a pedal displacement sensor configured to sense the displacement of the brake pedal; and an electronic control unit (ECU) configured to control the motor and valves on the basis of hydraulic pressure information and displacement information of the brake pedal, wherein the hydraulic pressure supply device generates the hydraulic pressure using the rotational force of the motor that is activated in response to the electrical signal output from the pedal displacement sensor.

Also, the backup flow path is connected to the hydraulic flow path to be connected to the hydraulic control unit, wherein the electric brake system further includes: a cut value provided between the master cylinder and a connection position of the backup flow path and the hydraulic flow path to which the backup flow path is connected, thereby control a hydraulic pressure flow, and wherein the cut valve is closed to deliver the hydraulic pressure discharged from the hydraulic pressure supply device to the wheel cylinder in a normal mode, and the cut valve is opened to deliver the hydraulic pressure discharged from the master cylinder to the wheel cylinder in an abnormal mode.

Also, the electric brake system further comprises a pressure sensor provided at a connection position of the master cylinder and the backup flow path.

Also, the hydraulic pressure supply device includes: a pressure chamber connected to the first reservoir through a hydraulic pressure supply oil flow path to store oil; and a check valve installed at the hydraulic pressure supply oil flow path and configured to allow oil to flow from the first reservoir to the pressure chamber and to block the oil from flowing from the pressure chamber to the first reservoir.

Also, the simulation device includes: a simulation block; a simulation chamber formed at the simulation block and connected to the first chamber through the simulation flow path to store oil; a reaction force portion installed inside the simulation chamber and configured to provide a reaction force; and a damping housing provided to support the reaction force portion and to be able to slide inside the simulation block.

In accordance with other aspect of the present invention, there is provided an electric brake system, which comprises a reservoir configured to store oil; a master cylinder connected to the reservoir, provided with first and second chambers, first and second pistons respectively provided at the first and second chambers, and first and second hydraulic ports formed to be respectively connected to the first and second chambers, and configured to discharge oil according to a pedal effort of a brake pedal; a pedal displacement sensor configured to sense a displacement of the brake pedal; a first backup flow path configured to connect the first hydraulic port to a wheel cylinder; a second backup flow path configured to connect the second hydraulic port to a wheel cylinder; a first cut valve provided at the first backup flow path to control an oil flow therein; a second cut valve provided at the second backup flow path to control an oil flow therein; a simulation device configured to provide a reaction force according to the pedal effort of the brake pedal and provided with a simulation chamber that is connected to the master cylinder and a simulation flow path to store oil therein; a hydraulic pressure supply device configured to generate hydraulic pressure using a rotational force of a motor that is activated in response to an electrical signal output from the pedal displacement sensor; a first hydraulic flow path connected to the hydraulic pressure supply device and connected to the first backup flow path; a second hydraulic flow path connected to the hydraulic pressure supply device and connected to the second backup flow path; a hydraulic control unit connected to the first and second hydraulic flow paths, configured to deliver the hydraulic pressure delivered from the hydraulic pressure supply device to a wheel cylinder provided at each of wheels, and provided with first and second hydraulic circuits respectively connected to different wheel cylinders; and an electronic control unit (ECU) configured to control the motor and valves on the basis of hydraulic pressure information and displacement information of the brake pedal, wherein the first cut valve and the second cut valve are closed and the hydraulic pressure generated according to movement of the first piston is delivered to the simulation device through the simulation flow path in a normal mode, and the first cut valve and the second cut valve are opened and the hydraulic pressure generated according to movements of the first piston and the second piston delivered to the wheel cylinder through the first backup flow path and the second backup flow path in an abnormal mode.

Also, the master cylinder further includes: first and second sealing members located in front of and behind the simulation flow path and configured to seal oil of the first chamber and the second chamber, wherein a depression is formed at an outer surface of the second piston to provide a gap, through which the oil flows, between the first sealing member and the second piston, wherein the first sealing member is disposed to be accommodated in the depression formed at the outer surface of the second piston and the oil flows through a gap between an inner wall of the master cylinder and the second piston and through the depression formed at the outer surface of the second piston to be delivered to the simulation flow path in the normal mode, and wherein the first sealing member seals the gap between the inner wall of the master cylinder and the second piston by a forward movement of the second piston in the abnormal mode.

Also, the hydraulic control unit further includes: a first inlet valve, a second inlet valve, a third inlet valve, and a fourth inlet valve which are provided at upstream sides of the wheel cylinders, respectively, to control the hydraulic pressure being delivered to the wheel cylinders provided at the wheels; a first switching valve configured to control a connection between the hydraulic pressure supply device and the first and second inlet valves and provided at a flow path at which the hydraulic pressure supply device is connected to the first backup flow path; and a second switching valve configured to control a connection between the hydraulic pressure supply device and the third and fourth inlet valves and provided at a flow path at which the hydraulic pressure supply device is connected to the second backup flow path.

Also, the hydraulic control unit further includes: a first inlet valve, a second inlet valve, a third inlet valve, and a fourth inlet valve which are provided at upstream sides of the wheel cylinders, respectively, to control the hydraulic pressure being delivered to the wheel cylinders installed at the wheels; a first balance valve configured to control a connection between two wheel cylinders connected to the first inlet valve and the second inlet valve, respectively; and a second balance valve configured to control a connection between two wheel cylinders connected to the third inlet valve and the fourth inlet valve, respectively.

BRIEF DESCRIPTION OF THE DRAWINGS

FIG. 1 is a hydraulic circuit diagram illustrating a non-braking state of an electric brake system according to one embodiment of the present disclosure.

FIG. 2 is a cross sectional view for describing the simulation device according to one embodiment of the present disclosure.

FIG. 3 is a hydraulic circuit diagram illustrating a state in which the electric brake system according to one embodiment of the present disclosure normally performs a braking operation.

FIG. 4 is a hydraulic circuit diagram illustrating a state in which the electric brake system according to one embodiment of the present disclosure releases braking normally.

FIG. 5 is a hydraulic circuit diagram for describing a state in which an anti-lock brake system (ABS) is operated through the electric brake system according to one embodiment of the present disclosure.

FIG. 6 is a hydraulic circuit diagram illustrating a case in which the electric brake system according to one embodiment of the present disclosure operates abnormally.

FIG. 7 shows a state in which the electric brake system according to one embodiment of the present disclosure operates normally.

FIG. 8 is a perspective view of the second piston 22a.

FIG. 9 shows a state in which the electric brake system according to one embodiment of the present disclosure operates abnormally.

FIG. 10 is a hydraulic circuit diagram illustrating a non-braking state of an electric brake system according to another embodiment of the present disclosure.

FIG. 11 is a hydraulic circuit diagram illustrating a normal braking state of the electric brake system according to another embodiment of the present disclosure.

FIG. 12 is a hydraulic circuit diagram illustrating a state in which the electric brake system according to another embodiment of the present disclosure normally releases braking.

FIG. 13 is a hydraulic circuit diagram for describing a state in which an ABS is operated through the electric brake system according to another embodiment of the present disclosure.

FIG. 14 is a hydraulic circuit diagram for describing a state in which the electric brake system of another embodiment of the present disclosure operates in a dump mode.

FIG. 15 is a hydraulic circuit diagram illustrating a state in which the electric brake system according to another embodiment of the present disclosure operates abnormally.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a hydraulic circuit diagram illustrating a non-braking state of an electric brake system 1 according to one embodiment of the present disclosure.

Referring to FIG. 1, the electric brake system 1 generally includes a master cylinder 20 for generating hydraulic pressure, a reservoir 30 coupled to an upper part of the master cylinder 20 to store oil, an input rod 12 for pressurizing the master cylinder 20 according to a pedal effort of a brake pedal 10, a wheel cylinder 40 for receiving the hydraulic pressure to perform braking of each of wheels RR, RL, FR, and FL, a pedal displacement sensor 11 for sensing a displacement of the brake pedal 10, and a simulation device 50 for providing a reaction force according to the pedal effort of the brake pedal 10.

The master cylinder 20 may be configured to include at least one chamber to generate hydraulic pressure. As one example, the master cylinder 20 may be configured to include two chambers 21c and 22c, a first piston 21a may be provided at the first chamber 21c and a second piston 22a may be provided at the second chamber 22c, and the first piston 21a may be connected to the input rod 12. Here, the first chamber 21c may be a space comparted by means of a rear end of the first piston 21a, a front end of the second piston 22a, and an outer wall of the master cylinder 20, and the second chamber 22c may be a space comparted by means of a rear end of the second piston 22a and the outer wall of the master cylinder 20.

Meanwhile, the master cylinder 20 may include two chambers to secure safety when one chamber fails. For example, one of two chambers may be connected to a front right wheel FR and a rear left wheel RL of a vehicle, and the remaining chamber may be connected to a front left wheel FL and a rear right wheel RR. Otherwise, one of the two chambers may be connected to two front wheels FR and FL and the remaining chamber may be connected to two rear wheels RR and RL. As described above, the two chambers may be independently configured so that braking of a vehicle may be possible even when one of the two chambers fails.

For this purpose, the master cylinder 20 may include first and second hydraulic ports 24a and 24b which are formed thereon and through which hydraulic pressure is discharged from each of the two chambers 21c and 22c. As one example, the first hydraulic port 24a may be connected to the first chamber 21c, and the second hydraulic port 24b may be connected to the second chamber 22c.

Further, a first spring 21b may be provided between the first piston 21a and the second piston 22a of the master cylinder 20, and a second spring 22b may be provided between the second piston 22a and a rear end of the master cylinder 20.

The first spring 21b and the second spring 22b are provided at the first and second chambers 21c and 22c, respectively, and an elastic force is stored in the first spring 21b and the second spring 22b when the first piston 21a and the second piston 22a are compressed according to a variance of displacement of the brake pedal 10. Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 pressurizing the first piston 21a of the master cylinder 20 may come into close contact with the first piston 21a. In other words, no gap may exist between the master cylinder 20 and the input rod 12. Consequently, when the brake pedal 10 is stepped on, the master cylinder 20 may be directly pressurized without a pedal dead stroke section.

FIG. 2 is a cross sectional view for describing the simulation device 50 according to one embodiment of the present disclosure.

The simulation device 50 may be connected to the chambers 21c and 22c of the master cylinder 20 to provide a reaction force according to a pedal effort of the brake pedal 10. A reaction force may be provided to compensate for a pedal effort provided from a driver such that a braking force may be finely controlled as intended by the driver.

The simulation device 50 may include a simulation block 52, a simulation chamber 51 formed at a front end of the simulation block 52 to store oil flowing out of the first hydraulic port 24a of the master cylinder 20, first and second reaction force portions installed inside the simulation chamber 51 to provide a pedal feeling, and a damping housing 59 supporting the second reaction force portion and slidably provided inside the simulation block 52. At this point, the first reaction force portion, the second reaction force portion, and the damping housing 59 may be disposed in series inside the simulation block 52.

The simulation block 52 may include an oil flow path 52a formed at an upper part of the simulation block 52 to deliver hydraulic pressure from the master cylinder 20, and bores 52b and 52c communicating with the oil flow path 52a. At this point, a first bore 52b, at which the first reaction force portion formed at the simulation block 52 is disposed, and a second bore 52c, at which the second reaction force portion is disposed, are formed to be stepped. As one embodiment, an inner diameter of the second bore 52c provided in a cylindrical shape may be provided to be greater than that of the first bore 52b provided in a cylindrical shape.

The first reaction force portion may include a first reaction force piston 53 slideably installed at the first bore 52b, a first damping member 54 installed to move together with the first reaction force piston 53, and a first reaction force spring 55 compressed by the first reaction force piston 53.

The first reaction force piston 53 is installed to move downward when hydraulic pressure is delivered through the oil flow path 52a located over the first reaction force piston 53. At this point, an insertion depression 53a, which is formed to be upwardly convex, may be formed at a lower end of the first reaction force piston 53. Also, the insertion depression 53a may include a stair-type stepped portion 53b having a diameter that gradually decreases from a lower side of the first reaction force piston 53 to an upper side thereof.

Referring to FIG. 2, the first damping member 54 may be inserted into the insertion depression 53a and installed at an upper side based on the stepped portion 53b, and an upper end of the first reaction force spring 55 may be supported at the stepped portion 53b. Therefore, when the first reaction force piston 53 is moved, the first damping member 54 is moved together with the first reaction force piston 53, and the first reaction force spring 55 provides a reaction force.

The first reaction force spring 55 has a coil shape providing an elastic force to provide a reaction force to the brake pedal 10. At this point, a lower end of the first reaction force spring 55 is supported by a second reaction force piston 56 which will be described below.

The first damping member 54 may be configured with a rubber material enabling elastic deformation, and may provide a reaction force to the brake pedal 10 by coming into contact with and being pressurized by the second reaction force piston 56 which will be described below.

The second reaction force portion may include the second reaction force piston 56 slidably provided at the second bore 52c, a second reaction force spring 57 installed between the second reaction force piston 56 and the damping housing 59 and compressed by means of the second reaction force piston 56, and a second damping member 58 installed at and supported by the damping housing 59.

The second reaction force piston 56 is provided to be spaced apart from the first reaction force piston 53 at a regular interval, thereby supporting the lower end of the first reaction force spring 55. More particularly, the second reaction force piston 56 may be provided at a position opposite the insertion depression 53a, and may include a protrusion 56a formed to protrude toward the first damping member 54 and an extension 56b formed to extend from a lower end of the protrusion 56a in an outwardly radial direction.

As shown in the drawing, the protrusion 56a protrudes toward the first bore 52b, an upper part of the protrusion 56a is located inside the first reaction force piston 53, and the protrusion 56a is spaced apart from the first damping member 54 at a regular interval. At this point, the protrusion 56a may be inserted into the first reaction force spring 55 to enable the lower end of the first reaction force spring 55 to be supported by the extension 56b.

The extension 56b is disposed in the second bore 52c to support the lower end of the first reaction force spring 55 and an upper end of the second reaction force spring 57. At this point, the extension 56b may be configured to pressurize the second damping member 58 provided below the extension 56b to be formed to have a flat-shaped lower surface. Also, the extension 56b may be provided to have a diameter corresponding to that of the second bore 52c to be guided to move by the second bore 52c when the extension 56b slides therein.

The second reaction force spring 57 has a coil shape providing an elastic force to provide a reaction force to the brake pedal 10. That is, the second reaction force spring 57 is compressed while the second reaction force piston 56 is moved to provide a reaction force to the brake pedal 10. In this case, an elastic coefficient of the second reaction force spring 57 may be provided to be greater than that of the first reaction force spring 55. Therefore, the second reaction force piston 56 may be provided to move after the first reaction force piston 53 is moved.

The second damping member 58 may be configured with a rubber material which enables elastic deformation, and may provide a reaction force to the brake pedal 10 by coming into contact with and being pressurized by the second reaction force piston 56.

Referring to the drawing, the second damping member 58 is installed at the damping housing 59, and an upper part of the second damping member 58 installed at the damping housing 59 is provided to come into contact with the second reaction force piston 56. However, the second damping member 58 is not limited thereto and its upper part may be provided to come into contact with the second reaction force piston 56 after the second reaction force piston 56 is moved downward a predetermined distance.

The damping housing 59 is provided at a lower end of the second bore 52c to be spaced apart from the second reaction force piston 56 by a regular interval. More particularly, the damping housing 59 may include a body portion 59a having a cylindrical shape which has an open upper part, and a flange portion 59b extending from an outer circumferential surface of the body portion 59a in a radial direction.

The upper part of the body portion 59a is open to form an accommodation space therein, and the second damping member 58 is installed in the accommodation space through the open upper part. At this point, an upper part of an inner surface of the body portion 59a may have a surface inclined toward the outside to easily enable elastic deformation when the second damping member 58 is elastically deformed.

The flange portion 59b is formed to extend from the body portion 59a in the radial direction, and an upper surface of the flange portion 59b supports the lower end of the second reaction force spring 57.

Hereinafter, an operating process of the simulation device 50 will be described.

The simulation device 50 may include the two reaction force springs 55 and 57 and the two damping members 54 and 58 to consecutively provide a pedal feeling through the first reaction force portion and the second reaction force portion. That is, while the first reaction force piston 53 of the first reaction force portion compresses the first reaction force spring 55 by means of hydraulic pressure provided through the oil flow path 52a to come into contact with the second reaction force piston 56 of the second reaction force portion, a reaction force (a pedal feeling) is provided to the driver. Also, when a hydraulic pressure greater than the above described hydraulic pressure is provided, the reaction force is provided to the driver while the second reaction force piston 56, which is pressurized by means of the first reaction force piston 53, pressurizes the second reaction force spring 57 and the second damping member 58.

In particular, when hydraulic pressure is provided from the master cylinder 20 through the oil flow path 52a of the simulation block 52, the first reaction force piston 53 is pushed to pressurize the first reaction force spring 55 to generate a reaction force. Further, the first damping member 54 installed at the first reaction force piston 53 is moved to come into contact with the second reaction force piston 56 and to be compressed by means of the second reaction force piston 56 to generate a reaction force. Moreover, the first reaction force piston 53 is moved, the lower end thereof comes into contact with the second reaction force piston 56, and the second reaction force piston 56 is pushed to compress the second reaction force spring 57 to generate a reaction force. Thereafter, the second reaction force piston 56 comes into contact with and pressurizes the second damping member 58 located below the second reaction force piston 56 so that the second damping member 58 is pressed to generate a reaction force. That is, the reaction force, which is delivered to the driver while the second reaction force portion is moved is provided by adding the reaction force of the first reaction force portion to the reaction force of the second reaction force portion.

Consequently, the reaction forces are added to each other in consecutive order to be delivered to the driver according to a magnitude of pressure applied to the brake pedal 10 by the driver. Also, the reaction force provided by the simulation device 50 according to the embodiment of the present disclosure may be provided in a second order curve shape, which is similar to a graph of a reaction force provided by a pedal simulator of a conventional brake system (CBS), thereby eliminating a different feeling of a brake pedaling.

The electric brake system 1 according to the embodiment of the present disclosure may include a hydraulic pressure supply device 100 which is mechanically operated by receiving a braking intent of the driver in the form of an electrical signal from the pedal displacement sensor 11 measuring a displacement of the brake pedal 10, a hydraulic control unit 200 configured with first and second hydraulic circuits 201 and 202, each of which is provided with two wheels, controlling a hydraulic pressure flow delivered to the wheel cylinder 40 that is provided at each of the wheels RR, RL, FR, and FL, a first cut valve 261 provided at a first backup flow path 251 connecting the first hydraulic port 24a to the first hydraulic circuit 201 to control a hydraulic pressure flow, a second cut valve 262 provided at a second backup flow path 252 connecting the second hydraulic port 24b to the second hydraulic circuit 202 to control a hydraulic pressure flow, and an electronic control unit (ECU) (not shown) controlling the hydraulic pressure supply device 100 and valves 221, 222, 223, 224, 231, 232, 241, 242, 261, and 262 on the basis of hydraulic pressure information and pedal displacement information.

The hydraulic pressure supply device 100 includes a pressure supply unit 110 providing oil pressure delivered to the wheel cylinder 40, a motor 120 generating a rotational force in response to an electrical signal of the pedal displacement sensor 11, and a power conversion unit 130 converting a rotational movement of the motor 120 into a rectilinear movement and transmitting the rectilinear movement to the pressure supply unit 110.

The hydraulic pressure supply unit 110 may include a pressure chamber 111 in which a predetermined space is formed to receive and store oil, a hydraulic piston 112 provided inside the pressure chamber 111, and a hydraulic spring 113 provided between the hydraulic piston 112 and the pressure chamber 111 to elastically support the hydraulic piston 112.

The pressure chamber 111 may be connected to the reservoir 30 by means of an oil flow path 114 and may receive oil from the reservoir 30 and store the oil. The oil flow path 114 may communicate with a first communicating hole 111a that is formed at an inlet side of the pressure chamber 111. As one example, the first communicating hole 111a may be formed at the inlet side of the pressure chamber 111 in which pressure is generated while the hydraulic piston 112 is moved forward.

Also, a check valve 115 may be installed at the oil flow path 114 to prevent the pressure of the pressure chamber 111 from backflowing. The check valve 115 is provided to block the oil inside the pressure chamber 111 from leaking to the reservoir 30 through the oil flow path 114 while the hydraulic piston 112 is moved forward, and it is provided to allow the oil inside the reservoir 30 to be suctioned and stored in the inlet side of the pressure chamber 111 while the hydraulic piston 112 is returned to its original position.

The motor 120 is a device for generating a rotational force according to a signal output from the ECU (not shown) and may generate a rotational force in a forward or backward direction. An angular velocity and a rotational angle of the motor 120 may be precisely controlled. Because such a motor 120 is generally known in the art, a detailed description thereof will be omitted.

Meanwhile, the ECU controls not only the motor 120, but also valves provided in the electric brake system 1 of the present disclosure, which will be described below. An operation of controlling a plurality of valves according to a displacement of the brake pedal 10 will be described below.

A driving force of the motor 120 generates a displacement of the hydraulic piston 112 through the power conversion unit 130, and the hydraulic pressure, which is generated while the hydraulic piston 112 slides inside the pressure chamber 111, is delivered to the wheel cylinder 40 installed at each of the wheels RR, RL, FR, and FL through first and second hydraulic flow paths 211 and 212.

The power conversion unit 130 is a device for converting a rotational force into a rectilinear movement, and may be configured with a worm shaft 131, a worm wheel 132, and a drive shaft 133.

The worm shaft 131 may be integrally formed with a rotational shaft of the motor 120 and rotates the worm wheel 132 engaged therewith and coupled thereto through a worm that is formed on an outer circumferential surface of the worm shaft 131. The worm wheel 132 linearly moves the drive shaft 133 engaged therewith and coupled thereto, and the drive shaft 133 is connected to the hydraulic piston 112 to slide the hydraulic piston 112 inside the pressure chamber 111.

To describe such operations again, a signal, which is sensed by the pedal displacement sensor 11 when a displacement occurs at the brake pedal 10, is transmitted to the ECU (not shown), and then the ECU activates the motor 120 in one direction to rotate the worm shaft 131 in the one direction. A rotational force of the worm shaft 131 is transmitted to the drive shaft 133 via the worm wheel 132, and then the hydraulic piston 112 connected to the drive shaft 133 is moved to generate hydraulic pressure in the pressure chamber 111.

On the other hand, when the pedal effort is released from the brake pedal 10, the ECU drives the motor 120 in a reverse direction to reversely rotate the worm shaft 131. Consequently, the worm wheel 132 is also reversely rotated, and then the hydraulic piston 112 connected to the drive shaft 133 is returned to its original position. At this point, the hydraulic spring 113 may provide an elastic force to the hydraulic piston 112 so that the hydraulic pressure inside the pressure chamber 111 may be rapidly discharged.

As described above, the hydraulic pressure supply device 100 serves to deliver the hydraulic pressure to the wheel cylinders 40 or to discharge and deliver the hydraulic pressure to the reservoir 30 according to a rotational direction of the rotational force generated from the motor 120.

Further, although not shown in the drawing, the power conversion unit 130 may be configured with a ball screw nut assembly. For example, the power conversion unit 130 may be configured with a screw which is integrally formed with the rotational shaft of the motor 120 or is connected to and rotated with the rotational shaft, and a ball nut which is screw-coupled to the screw in a state in which a rotation of the ball nut is restricted to perform a rectilinear movement according to a rotation of the screw. The hydraulic piston 112 is connected to the ball nut of the power conversion unit 130 to pressurize the pressure chamber 111 by means of the rectilinear movement of the ball nut, and the hydraulic spring 113 serves to return the hydraulic piston 112 to its original position while the ball nut is returned to its original position. Such a ball screw nut assembly is a device for converting a rotational movement into a rectilinear movement, and a structure thereof is generally known in the art so that a detailed description thereof will be omitted.

Also, it should be understood that the power conversion unit 130 according to the embodiment of the present disclosure may employ any structure capable of converting a rotational movement into a rectilinear movement in addition to the structure of the ball screw nut assembly.

Next, the hydraulic control unit 200 according to one embodiment of the present disclosure will be described with reference back to FIG. 1.

The hydraulic control unit 200 may be configured with the first hydraulic circuit 201 and the second hydraulic circuit 202, each of which receives hydraulic pressure to control two wheels. As one example, the first hydraulic circuit 201 may control the front right wheel FR and the rear left wheel RL, and the second hydraulic circuit 202 may control the front left wheel FL and the rear right wheel RR. Further, the wheel cylinder 40 is installed at each of the wheels FR, FL, RR, and RL to perform braking by receiving the hydraulic pressure.

Also, the hydraulic control unit 200 may receive hydraulic pressure from the hydraulic pressure supply device 100 through the first hydraulic flow path 211 connecting the first hydraulic circuit 201 and the hydraulic pressure supply device 100, and the second hydraulic flow path 212 connected to the second hydraulic circuit 202. At this point, the second hydraulic flow path 212 may be connected to a branching flow path 214 that branches from the first hydraulic flow path 211.

Further, the first and second hydraulic flow paths 211 and 212 are connected to each other through the branching flow path 214 and receive the hydraulic pressure from the hydraulic pressure supply device 100 to deliver the received hydraulic pressure to the wheel cylinder 40 of each of the hydraulic circuits 201 and 202. At this point, each of the hydraulic circuits 201 and 202 may be provided with a plurality of inlet valves 221 to control a hydraulic pressure flow.

As one example, two inlet valves 221 may be provided in the first hydraulic circuit 201, be connected to the first hydraulic flow path 211 and independently control the hydraulic pressure delivered to two of the wheel cylinders 40. Also, two inlet valves 221 are provided in the second hydraulic circuit 202, be connected to the second hydraulic flow path 212 and independently control the hydraulic pressure delivered to two of the wheel cylinders 40.

The plurality of inlet valves 221 may be disposed at an upstream side of each of the wheel cylinders 40 and may be configured with a normally opened type solenoid valve that is usually opened and is closed when a closing signal is received from the ECU.

Also, the hydraulic control unit 200 may be further provided with a plurality of outlet valves 222 connected to the reservoirs 30 to improve brake performance when the brake is released. Each of the outlet valves 222 is connected to the wheel cylinder 40 to control discharging of the hydraulic pressure from each of the wheels RR, RL, FR, and FL. That is, when brake pressure of each of the wheels RR, RL, FR, and FL is measured and a decompression of the brake is determined to be required, the outlet valves 222 may be selectively opened to control the brake pressure.

Further, the outlet valves 222 may be configured with a normally closed type solenoid valve that is usually closed and is opened when an opening signal is received from the ECU.

In addition, the electric brake system 1 according to one embodiment of the present disclosure may further include a first switching valve 231 provided at the first hydraulic flow path 211 and a second switching valve 232 provided at the second hydraulic flow path 212.

The first and second switching valves 231 and 232 are independently controlled and may be configured with a normally closed type solenoid valve that is usually closed and is opened when an opening signal is received. The first and second switching valves 231 and 232 serve to control a hydraulic pressure flow delivered to the wheel cylinders 40 by being selectively opened and closed according to a required pressure. For example, when hydraulic pressure should be delivered only to the wheel cylinders 40 provided at the first hydraulic circuit 201, the first switching valve 231 is only opened to deliver the hydraulic pressure discharged through the hydraulic pressure supply device 100 to the first hydraulic circuit 201 rather than the second hydraulic circuit 202. Operational structures of the first and second switching valves 231 and 232 will be described again below.

Also, the electric brake system 1 according to one embodiment of the present invention may further include a release valve 233 that controls a pressure to converge on a set target pressure value when the pressure according to a pedal effort of the brake pedal 10 is generated to be higher than the set target pressure value.

The release valve 233 may be provided at a flow path connecting the reservoir 30 to the branching flow path 214 that connects the two hydraulic circuits 201 and 202. That is, the release valve 233 may be provided between the first and second switching valves 231 and 232 and the hydraulic pressure supply device 100. The release valve 233 may be configured with a normally closed type solenoid valve that is usually closed and is opened when an opening signal is received.

The electric brake system 1 according to one embodiment of the present disclosure may further include the first and second backup flow paths 251 and 252 capable of directly supplying the oil discharged from the master cylinder 20 to the wheel cylinders 40 when the electric brake system 1 operates abnormally.

The first cut valve 261 for controlling an oil flow may be provided at the first backup flow path 251, and the second cut valve 262 for controlling an oil flow may be provided at the second backup flow path 252. Also, the first backup flow path 251 may connect the first hydraulic port 24a to the first hydraulic circuit 201, and the second backup flow path 252 may connect the second hydraulic port 24b to the second hydraulic circuit 202.

Further, the first and second cut valves 261 and 262 may be configured with a normally opened type solenoid valve that is usually opened and is closed when a closing signal is received from the ECU. Operational structures of the first and second cut valves 261 and 262 will be described again below.

Meanwhile, an undescribed reference number "PS11" is a first hydraulic flow path pressure sensor which senses hydraulic pressure of the first hydraulic circuit 201, an undescribed reference number "PS12" is a second hydraulic flow path pressure sensor which senses hydraulic pressure of the second hydraulic circuit 202, and an undescribed reference number "PS2" is a backup flow path pressure sensor which senses oil pressure of the master cylinder 20. Further, an undescribed reference number "MPS" is a motor control sensor which controls a rotational angle or a current of the motor 120.

Hereinafter, an operation of the electric brake system 1 according to one embodiment of the present invention will be described in detail.

FIG. 3 is a hydraulic circuit diagram illustrating a state in which the electric brake system 1 according to one embodiment of the present disclosure normally performs a braking operation.

Referring to FIG. 3, when a driver begins braking, an amount of braking requested by the driver may be sensed through the pedal displacement sensor 11 on the basis of information including pressure applied to the brake pedal 10 by the driver or the like. The ECU (not shown) receives an electrical signal output from the pedal displacement sensor 11 to activate the motor 120.

Also, the ECU may receive an amount of regenerative braking through the backup flow path pressure sensor PS2 provided at the outlet side of the master cylinder 20 and the first and second hydraulic flow path pressure sensors PS11 and PS12 respectively provided at the first and second hydraulic circuits 201 and 202, and may calculate an amount of braking friction based on a difference between the amount of braking requested by the driver and the amount of regenerative braking, thereby determining the magnitude of an increase or reduction of pressure at the wheel cylinder 40.

In particular, when the driver steps on the brake pedal 10 at an initial stage of braking, the motor 120 is activated, a rotational force of the motor 120 is delivered to the pressure supply unit 110 by means of the power conversion unit 130, and thus the hydraulic pressure discharged from the hydraulic pressure supply unit 110 is delivered to the first hydraulic flow path 211 and the second hydraulic flow path 212.

Meanwhile, when the hydraulic pressure is generated in the hydraulic pressure supply device 100, the first and second cut valves 261 and 262, which are installed at the first and second backup flow paths 251 and 252 connected to the first and second hydraulic ports 24a and 24b of the master cylinder 20, are closed so that the hydraulic pressure discharged from the master cylinder 20 is not delivered to the wheel cylinders 40.

Also, the hydraulic pressure discharged from the hydraulic pressure supply device 100 is delivered to the wheel cylinder 40 installed at each of the wheels RR, RL, FR, and FL according to the opening of the inlet valves 221 to generate a braking force. At this point, when the pressure delivered to the first and second hydraulic circuits 201 and 202 is measured as being higher than a target pressure value according to the pedal effort of the brake pedal 10, the release valve 233 is opened to control the pressure to converge on the target pressure value.

Meanwhile, the pressure generated by means of a pressurization of the master cylinder 20 according to the pedal effort of the brake pedal 10 is delivered to the simulation device 50 connected to the master cylinder 20 to provide an appropriate pedal feeling to the driver.

Next, a case of releasing the braking force in a braking state established when the electric brake system 1 according to one embodiment of the present disclosure operates normally will be described.

FIG. 4 is a hydraulic circuit diagram illustrating a state in which the electric brake system 1 according to one embodiment of the present disclosure releases braking normally.

Referring to FIG. 4, when a pedal effort applied to the brake pedal 10 is released, the motor 120 generates a rotational force in a reverse direction compared to that of when the braking operation is performed to deliver the generated rotational force to the power conversion unit 130, and the worm shaft 131, the worm wheel 132, and the drive shaft 133 of the power conversion unit 130 are rotated in a reverse direction compared to that of when the braking operation is performed to move the hydraulic piston 112 backward and return the hydraulic piston 112 to its original position, thereby releasing the pressure of the pressure supply unit 110. Further, the pressure supply unit 110 receives the hydraulic pressure discharged from the wheel cylinder 40 through the first and second hydraulic flow paths 211 and 212 to deliver the received hydraulic pressure to the reservoir 30.

Meanwhile, opening and closing operational states of the inlet valves 221, the outlet valves 222, the first and second switching valves 231 and 232, the release valve 233, and the first and second cut valves 261 and 262 are controlled the same way as they are in the braking operation. That is, the outlet valves 222, the release valve 233, and the first and second cut valves 261 and 262 are closed, whereas the inlet valves 221 and the first and second switching valves 231 and 232 are opened. As a result, the hydraulic pressure discharged from the wheel cylinders 40 of the first and second hydraulic circuits 201 and 202 is delivered to the pressure chamber 111 through the first and second hydraulic flow paths 211 and 212.

Further, the electric brake system 1 according to one embodiment of the present disclosure may control the valves 221 and 222 provided at the hydraulic control unit 200 according to pressure required for the wheel cylinder 40 provided at each of the wheels RR, RL, FR, and FL of the two hydraulic circuits 201 and 202 to specify and control a control range.

FIG. 5 is a hydraulic circuit diagram for describing a state in which an anti-lock brake system (ABS) is operated through the electric brake system 1 according to one embodiment of the present disclosure.

FIG. 5 show a case of braking only a relevant wheel cylinder during operation of the ABS, and a state of braking only the wheels RL and FR of the first hydraulic circuit 201 is illustrated.

Referring to FIG. 5, the motor 120 is activated according to a pedal effort of the brake pedal 10, and a rotational force of the motor 120 is transmitted to the pressure supply unit 110 through the power conversion unit 130, thereby generating hydraulic pressure. At this point, the first and second cut valves 261 and 262 are closed and thus the hydraulic pressure discharged from the master cylinder 20 is not delivered to the wheel cylinders 40.

Also, because only the first switching valve 231 is opened and the second switching valve 232 is closed, the hydraulic pressure discharged from the hydraulic pressure supply device 100 is not delivered to the second hydraulic circuit 202. Further, the hydraulic pressure discharged from the hydraulic pressure supply device 100 is delivered to only the wheel cylinders 40 of the front right wheel FR and the rear left wheel RL, which are provided at the first hydraulic circuit 201, through the first hydraulic flow path 211. Consequently, the hydraulic pressure is delivered to only the wheels RL and FR of the first hydraulic circuit 201.

Meanwhile, the structure for controlling the hydraulic pressure delivered to the wheel cylinders 40 through opening and closing operations of the first and second switching valves 231 and 232 is merely one embodiment, and it should be understood that the embodiment of the present disclosure may include a variety of control modules capable of increasing or reducing the hydraulic pressure delivered to each of the wheels RL, RR, FL, and FR by independently opening and closing the inlet valves 221, the outlet valves 222, and the first and second switching valves 231 and 232.

That is, the electric brake system 1 according to the embodiment of the present disclosure may independently control operations of the motor 120 and the respective valves 221, 222, 231, 232, 233, 261, and 262 to selectively deliver or discharge the hydraulic pressure to or from the wheel cylinder 40 of each of the wheels RL, RR, FL, and FR according to a required pressure such that a precise control of the hydraulic pressure may be possible.

Next, a case in which such an electric brake system 1 operates abnormally will be described.

FIG. 6 is a hydraulic circuit diagram illustrating a case in which the electric brake system 1 according to one embodiment of the present disclosure operates abnormally.

Referring to FIG. 6, when the electric brake system 1 operates abnormally, each of the valves 221, 222, 231, 232, 233, 261, and 262 is provided in an initial state of braking, that is, a non-operating state. When a driver pressurizes the brake pedal 10, the input rod 12 connected to the brake pedal 10 is moved forward (in a left direction of the drawing) at the same time that the first piston 21a, which is in contact with the input rod 12, is moved forward (in the left direction of the drawing) and also the second piston 22a is moved forward (in the left direction of the drawing) by means of the first piston 21a. At this point, because there is no gap between the input rod 12 and the first piston 21a, the braking may be rapidly performed.

Further, the hydraulic pressure discharged from the master cylinder 20 is delivered to the wheel cylinders 40 through the first and second backup flow paths 251 and 252 that are connected for the purpose of backup braking to realize a braking force. At this point, the first and second cut valves 261 and 262 respectively installed at the first and second backup flow paths 251 and 252 and the inlet valves 221 provided at an upstream side of each of the wheels RR, RL, FR, and FL are configured with a normally opened type solenoid valve, and the outlet valves 222, the first and second switching valves 231 and 232, and the release valve 233 are configured with a normally closed type solenoid valve so that the hydraulic pressure is directly delivered to the wheel cylinders 40. Therefore, braking is stably realized to improve braking safety.

Next, the simulation device 50 will be described with reference to FIGS. 7 and 9. FIG. 7 shows a state in which the electric brake system 1 according to one embodiment of the present disclosure operates normally, and FIG. 9 shows a state in which the electric brake system 1 according to one embodiment of the present disclosure operates abnormally. Meanwhile, FIG. 8 is a perspective view of the second piston 22a of FIG. 8.

The simulation device 50 may be connected to the master cylinder 20 by means of a simulation flow path. The simulation flow path is provided at an upper part of the simulation block 52 and includes the oil flow path 52a communicating with the first chamber 21c. The oil flow path 52a is provided to be opened and closed according to a reciprocal movement of the second piston 22a. Opening and closing operations of the simulation flow path including the oil flow path 52a will be described again below.

Meanwhile, a sealing member 25 may be provided between the master cylinder 20 and the pistons 21a and 22a. The sealing member 25 prevents hydraulic pressure, which is generated by reciprocal movements of the pistons 21a and 22a, from leaking. As one example, the sealing member 25 provided at the first chamber 21c prevents losses of hydraulic pressure generated by a forward movement of the first piston 21a and negative pressure generated by a backward movement thereof. Further, the sealing member 25 provided at the second chamber 22c prevents losses of hydraulic pressure generated by a forward movement of the second piston 22a and negative pressure generated by a backward movement thereof.

Specifically, when the electric brake system 1 operates abnormally, hydraulic pressure, which is generated by means of the first piston 21a connected to the brake pedal 10 moving forward, should be delivered to the second piston 22a to move it forward. When the hydraulic pressure delivered from the first piston 21a to the second piston 22a leaks due to a failure of the sealing member 25, the hydraulic pressure is insufficiently provided to second chamber 22c such that a braking force is not generated as intended by the driver.

Meanwhile, the sealing member 25 may be provided at front and rear sides of a flow path communicating with the master cylinder 20. Because the pistons 21a and 22a move backward as well as forward, it is preferable that the sealing member 25 be provided at the front and rear sides of the flow path to prevent hydraulic pressure from leaking through the flow path. Here, the front side refers to a direction in which the driver steps on the brake pedal 10 to move the pistons 21a and 22a forward.

The master cylinder 20 and the reservoir 30 communicate with each other through a pair of flow paths 31 and 32. Therefore, the sealing member 25 may be provided at front and rear sides of the flow path 31 connected to the first chamber 21c, and at front and rear sides of the flow path 32 connected to the second chamber 22c.

In particular, the sealing member 25 located at the rear side of each of the flow paths 31 and 32 may prevent hydraulic pressure from leaking when the pistons 21a and 22a move forward, whereas the sealing member 25 located at the front side of each of the flow paths 31 and 32 may prevent negative pressure from leaking when the pistons 21a and 22a move backward.

Meanwhile, the flow path 32 connecting the reservoir 30 to the second chamber 22c may be located in front of the oil flow path 52a connecting the master cylinder 20 to the simulation device 50. At this point, the sealing member 25 may be provided at front and rear sides of the oil flow path 52a through which the master cylinder 20 and the simulation device 50 communicate.

Also, a first sealing member 25a, which is provided at the rear side of the flow path 32 connecting the reservoir 30 to the second chamber 22c, and a second sealing member 25b, which is provided at the front side of the oil flow path 52a connecting the master cylinder 20 to the simulation device 50, are provided as a single member.

In particular, the first sealing member 25a, which is provided at the rear side of the oil flow path 52a connecting the master cylinder 20 to the simulation device 50, may prevent hydraulic pressure from leaking when the second piston 22a moves forward. Also, the second sealing member 25b, which is located at a front side of the oil flow path 52a and at the rear side of the flow path 32 connecting the reservoir 30 to the second chamber 22c, may prevent not only hydraulic pressure from leaking into the reservoir 30 when the second piston 22a moves forward, but also negative pressure from leaking into the simulation device 50 when the second piston 22a moves backward. Further, a sealing member 25c, which is located at a front side of the flow path 32 connecting the reservoir 30 to the second chamber 22c, may prevent the negative pressure from leaking into the reservoir 30 when the second piston 22a moves backward.

Referring to FIG. 7, hydraulic pressure generated by a forward movement of the first piston 21a should be delivered to the simulation device 50 in a normal mode. For this purpose, a flow path 27 through which oil moves may be formed between the second piston 22a and the master cylinder 20. Consequently, even when the second piston 22a is located at an inlet of the oil flow path 52a, the second piston 22a may not block the inlet of the oil flow path 52a so that the first chamber 21c and the simulation device 50 may communicate with each other.

Meanwhile, a depression 26 may be formed at the second piston 22a to provide a gap between the first sealing member 25a and the second piston 22a in an initial position thereof (in a state in which pressure is not applied to the second piston 22a). The reason for that is that the flow path 27 communicating the first piston 21a with the master cylinder 20 may be blocked by the first sealing member 25a if the depression 26 is not formed at an outer circumferential surface of the second piston 22a.

Further, a flow path communicating the first chamber 21c with the oil flow path 52a may use a gap between an inner wall of the master cylinder 20 and the second piston 22a. Because an outer diameter of the second piston 22a is provided to be very slightly smaller than an inner diameter of the master cylinder 20 so that the second piston 22a may slide, oil may flow through a gap between the second piston 22a and the master cylinder 20.

Referring to FIG. 8, the depression 26 is formed at the outer circumferential surface of the second piston 22a. Further, the depression 26 accommodates the first sealing member 25a, and a gap is generated between the second piston 22a and the first sealing member 25a by the depression 26.

Referring back to FIG. 7, the first piston 21a moves forward by means of movement of the brake pedal 10 in the normal mode, and the hydraulic pressure provided to the first chamber 21c is delivered to the simulation device 50 along the flow paths 26 and 27 provided outside the second piston 22a. At this point, the first and second cut valves 261 and 262 are in a closed state. Meanwhile, the second piston 22a does not move forward in the normal mode.

Referring to FIG. 9, hydraulic pressure generated by the forward movement of the first piston 21a should be delivered to the first and second backup flow paths 251 and 252 in an abnormal mode. At this point, the first and second cut valves 261 and 262 are in an opened state.

In particular, the hydraulic pressure, which is provided to the first chamber 21c by means of the forward movement of the first piston 21a, should be delivered to the second piston 22a without loss. If the hydraulic pressure of the first chamber 21c leaks into the simulation device 50, hydraulic pressure as intended by the driver is not delivered to the second chamber 22c.

When the first piston 21a moves powerfully forward to push the second piston 22a, the depression 26 formed at the outer circumferential surface of the second piston 22a passes the first sealing member 25a. As a result, a gap between the second piston 22a and the inner wall of the master cylinder 20 is sealed by means of the first sealing member 25a, and an oil flow between the first chamber 21c and the simulation device 50 is blocked.

Next, a hydraulic control unit 200-1 according to another embodiment of the present disclosure will be described below with reference to FIG. 10.

FIG. 10 is a hydraulic circuit diagram illustrating a non-braking state of an electric brake system 2 according to another embodiment of the present disclosure.

The hydraulic control unit 200-1 may be configured with a first hydraulic circuit 201-1 and a second hydraulic circuit 202-1, each of which receives hydraulic pressure to control two wheels. As one example, the first hydraulic circuit 201-1 may control a front right wheel FR and a rear left wheel RL, and the second hydraulic circuit 202-1 may control a front left wheel FL and a rear right wheel RR. Further, a wheel cylinder 40 is installed at each of the wheels FR, FL, RR, and RL and receives hydraulic pressure to perform a braking operation thereon.

Also, the hydraulic control unit 200-1 may receive the hydraulic pressure from a hydraulic pressure supply device 100 through a main hydraulic flow path 210 connected to the first and second hydraulic circuits 201-1 and 202-1. Further, each of the hydraulic circuits 201-1 and 202-1 may include a plurality of valves 221a, 221b, 221c, 221d, 222a, 222b, 222c, 222d, 241, and 242 to control a hydraulic pressure flow.

The first hydraulic circuit 201-1 may include first and second inlet valves 221a and 221b connected to the main hydraulic flow path 210 to control the hydraulic pressure delivered to the wheel cylinders 40, first and second outlet valves 222a and 222b which control oil discharged from the wheel cylinders 40 provided at the first hydraulic circuit 201-1, and a first balance valve 241 which opens and blocks between two wheel cylinders 40 respectively connected to the first inlet valve 221a and the second inlet valve 221b.

More particularly, the first inlet valve 221a is provided at a first hydraulic flow path 213 connected to the main hydraulic flow path 210 and the front right wheel FR, and the second inlet valve 221b is provided at a second hydraulic flow path 214 connected to the main hydraulic flow path 210 and the rear left wheel RL.

The first outlet valve 222a is connected to the first hydraulic flow path 213 to control the hydraulic pressure delivered from the wheel cylinder 40 of the front right wheel FR, and the second outlet valve 222b is connected to the second hydraulic flow path 214 to control the hydraulic pressure delivered from the wheel cylinder 40 of the rear left wheel RL.

The first balance valve 241 is provided at a flow path connecting the first hydraulic flow path 213 to the second hydraulic flow path 214 to serve to open or block between the first and second hydraulic flow paths 213 and 214 according to opening and closing operations.

The second hydraulic circuit 201-1 may include third and fourth inlet valves 221c and 221d connected to the main hydraulic flow path 210 to control hydraulic pressure delivered to the wheel cylinders 40, third and fourth outlet valves 222c and 222d which control oil discharged from the wheel cylinders 40 provided at the second hydraulic circuit 202-1, and a second balance valve 242 which opens and blocks between two wheel cylinders 40 respectively connected to the third inlet valve 221c and the fourth inlet valve 221d.

More particularly, the third inlet valve 221c is provided at a third hydraulic flow path 215 connected to the main hydraulic flow path 210 and the rear right wheel RR, and the fourth inlet valve 221d is provided at a fourth hydraulic flow path 216 connected to the main hydraulic flow path 210 and the front left wheel FL.

The third outlet valve 222c is connected to the third hydraulic flow path 215 to control the hydraulic pressure discharged from the wheel cylinder 40 of the rear right wheel RR, and the fourth outlet valve 222d is connected to the fourth hydraulic flow path 216 to control the hydraulic pressure discharged from the wheel cylinder 40 of the front left wheel FL.

The second balance valve 242 is provided at a flow path connecting the third hydraulic flow path 215 to the fourth hydraulic flow path 216 to open or block between the third and fourth hydraulic flow paths 215 and 216 according to opening and closing operations.

Meanwhile, the opening and closing operations of the first to fourth inlet valves 221a, 221b, 221c, and 221d may be independently controlled by an ECU to deliver the hydraulic pressure discharged from the hydraulic pressure supply device 100 to each of the wheel cylinders 40. As one example, the first and second inlet valves 221a and 221b may control the hydraulic pressure supplied to the first hydraulic circuit 201-1, and the third and fourth inlet valves 221c and 221d may control the hydraulic pressure supplied to the second hydraulic circuit 202-1.

Also, the opening and closing operations of the first to fourth outlet valves 222a, 222b, 222c, and 222d may be independently controlled by the ECU to deliver the hydraulic pressure of the wheel cylinders 40 to reservoirs 30. As one example, the first and second outlet valves 222a and 222b may control the hydraulic pressure discharged from the wheel cylinders 40 of the first hydraulic circuit 201-1, and the third and fourth outlet valves 222c and 222d may control the hydraulic pressure discharged from the wheel cylinders 40 of the second hydraulic circuit 202-1.

Further, the electric brake system 2 may open two inlet valves among the four inlet valves 221a, 221b, 221c, and 221d to deliver the hydraulic pressure to the wheel cylinder 40 of each of the wheels FR, FL, RR, and RL. As one example, the first inlet valve 221a of the first and second inlet valves 221a and 221b may be opened and the fourth inlet valve 221d of the third and fourth inlet valves 221c and 221d may be opened so that the hydraulic pressure may be delivered to the wheel cylinder 40 of each of the wheels FR, FL, RR, and RL.

Meanwhile, the hydraulic pressure passing through the first and fourth inlet valves 221a and 221d may be delivered to neighboring wheel cylinders 40 through the first and second balance valves 241 and 242. As one example, the two inlet valves 221a and 221d may be opened in the first hydraulic circuit 201-1 and the second hydraulic circuit 202-1, respectively, and thus the hydraulic pressure may be delivered to each of the wheel cylinders 40. Also, according to a structure of a flow path connection, the two inlet valves 221a and 221b provided at the first hydraulic circuit 201-1 or the two inlet valves 221c and 221d provided at the second hydraulic circuit 202-1 may be opened so that the hydraulic pressure may be delivered to each of the wheel cylinders 40. In addition, when emergency braking is required, all of the inlet valves 221a, 221b, 221c, and 221d may be opened to rapidly deliver the hydraulic pressure to the wheel cylinders 40.

Such first to fourth inlet valves 221a, 221b, 221c, and 221d may be configured with a normally closed type solenoid valve that is usually closed and is opened when an opening signal is received from the ECU.

Also, the first and second balance valves 241 and 242 may be configured with a normally opened type solenoid valve that is usually open and is closed when a closing signal is received from the ECU, and the first to fourth outlet valve 222a, 222b, 222c, and 222d may be configured with a normally closed type solenoid valve that is usually closed and is opened when an opening signal is received from the ECU.

The electric brake system 2 according to another embodiment of the present disclosure may further include first and second backup flow paths 251 and 252 capable of directly supplying oil discharged from the master cylinder 20 to the wheel cylinders 40 when the electric brake system 2 operates abnormally.

A first cut valve 261 for controlling an oil flow may be provided at the first backup flow path 251, and a second cut valve 262 for controlling an oil flow may be provided at the second backup flow path 252. Also, the first backup flow path 251 may connect a first hydraulic port 24a to the first hydraulic circuit 201-1, and the second backup flow path 252 may connect a second hydraulic port 24b to the second hydraulic circuit 202-1.

In addition, the first backup flow path 251 may be connected to the first balance valve 241, which connects the first hydraulic flow path 213 to the second hydraulic flow path 214, and the second backup flow path 252 may be connected to the second balance valve 242, which connects the third hydraulic flow path 215 to the fourth hydraulic flow path 216.

Further, the first and second cut valves 261 and 262 may be configured with a normally opened type solenoid valve that is usually open and is closed when a closing signal is received from the ECU. Operational structures of the first and second cut valves 261 and 262 will be described again below.

Meanwhile, an undescribed reference number "PS1" is a hydraulic flow path pressure sensor which senses hydraulic pressure of the hydraulic control unit 200-1, and an undescribed reference number "PS2" is a backup flow path pressure sensor which measures oil pressure of the master cylinder 20. Further, an undescribed reference number "MPS" is a motor control sensor which controls a rotational angle or a current of a motor 120.

Hereinafter, an operation of the electric brake system 2 according to another embodiment of the present disclosure will be described in detail.

FIG. 11 is a hydraulic circuit diagram illustrating a normal braking state of the electric brake system 2 according to another embodiment of the present disclosure.

Referring to FIG. 11, when a driver begins braking, an amount of braking requested by the driver may be sensed through the pedal displacement sensor 11 on the basis of information including pressure applied to the brake pedal 10 by the driver or the like. The ECU (not shown) receives an electrical signal output from the pedal displacement sensor 11 to activate the motor 120.

Also, the ECU may receive an amount of regenerative braking through the backup flow path pressure sensor PS2 provided at an outlet side of the master cylinder 20 and the hydraulic flow path pressure sensor PS1 provided at the main hydraulic flow path 210, and calculate an amount of braking friction based on a difference between the amount of braking requested by the driver and the amount of regenerative braking, thereby determining a magnitude of an increase or reduction of pressure at the wheel cylinder 40.

In particular, when the driver steps on the brake pedal 10 at an initial stage of braking, the motor 120 is activated, a rotational force of the motor 120 is delivered to a pressure supply unit 110 by means of a power conversion unit 130, and thus the hydraulic pressure discharged from the hydraulic pressure supply unit 110 is delivered to the first to fourth hydraulic flow paths 213, 214, 215, and 216 through the main hydraulic flow path 210.

Meanwhile, when the hydraulic pressure is delivered from the hydraulic pressure supply device 100, the first and second cut valves 261 and 262, which are installed at the first and second backup flow paths 251 and 252 connected to the first and second hydraulic ports 24a and 24b of the master cylinder 20, are closed so that the hydraulic pressure discharged from the master cylinder 20 is not delivered to the wheel cylinders 40.

Also, the hydraulic pressure discharged from the hydraulic pressure supply device 100 is delivered to the wheel cylinders 40 installed at the wheels FR and FL according to the opening of the first and fourth inlet valves 221a and 221d to generate a braking force. Further, the hydraulic pressure being delivered through the first and fourth inlet valves 221a and 221d is delivered to the wheel cylinders 40 of the rear left wheel RL and the rear right wheel RR through the first and second balance valves 241 and 242 which are opened. That is, the hydraulic pressure is supplied to all of the wheel cylinders 40 by an opening operation of two selected inlet valves among the four inlet valves 221a, 221b, 221c, and 221d.

Such an operation is an operation in a general braking state, and, when emergency braking is required, all of the inlet valves 221a, 221b, 221c, and 221d may be opened to rapidly deliver the hydraulic pressure to the wheel cylinders 40.

Meanwhile, the pressure generated by means of a pressurization of the master cylinder 20 according to the pedal effort of the brake pedal 10 is delivered to the simulation device 50 connected to the master cylinder 20.

Next, a case of releasing the braking force in the braking state established when the electric brake system 2 according to another embodiment of the present disclosure operates normally will be described.

FIG. 12 is a hydraulic circuit diagram illustrating a state in which the electric brake system 2 according to another embodiment of the present disclosure normally releases braking.

Referring to FIG. 12, when a pedal effort applied to the brake pedal 10 is released, the motor 120 generates a rotational force in a reverse direction compared to that of when a braking operation is performed to deliver the generated rotational force to the power conversion unit 130, and a worm shaft 131, a worm wheel 132, and a drive shaft 133 of the power conversion unit 130 are rotated in a reverse direction compared to that of when a braking operation is performed to move a hydraulic piston 112 backward to its original position, thereby releasing the pressure of the hydraulic pressure supply unit 110. Further, the hydraulic pressure supply unit 110 receives the hydraulic pressure discharged from the wheel cylinders 40 through the main hydraulic flow path 210 to deliver the received hydraulic pressure to the reservoir 30.

Meanwhile, opening and closing operation states of the first to fourth inlet valves 221a, 221b, 221c, and 221d, the first to fourth outlet valves 222a, 222b, 222c, and 222d, the first and second balance valves 241 and 242, and the first and second cut valves 261 and 262 are controlled the same way as they are in the braking operation. That is, the first to fourth outlet valves 222a, 222b, 222c, and 222d, and the second and third inlet valves 221b and 221c are closed, whereas the first and fourth inlet valves 221a and 221d are opened. As a result, the hydraulic pressure discharged from the wheel cylinders 40 of the first hydraulic circuit 201-1 is delivered to the pressure chamber 111 through the first balance valve 241 and the first inlet valve 221a, and the hydraulic pressure delivered from the wheel cylinders 40 of the second hydraulic circuit 202-1 is delivered to the pressure chamber 111 through the second balance valve 242 and the fourth inlet valve 221d.

Further, the electric brake system 2 according to another of the present disclosure may control the valves 221a, 221b, 221c, 221d, 222a, 222b, 222c, 222d, 241, and 242 provided at the hydraulic control unit 200-1 according to pressure required for the wheel cylinder 40 provided at each of the wheels RR, RL, FR, and FL of the two hydraulic circuits 201-1 and 202-1, thereby specifying and controlling a control range.

FIG. 13 is a hydraulic circuit diagram for describing a state in which an ABS is operated through the electric brake system 2 according to another embodiment of the present disclosure.

FIG. 13 shows a case of braking only a relevant wheel cylinder while the ABS is operated, and a state of braking only the left wheels RL and FL is illustrated.

Referring to FIG. 13, the motor 120 is activated according to a pedal effort of the brake pedal 10, and a rotational force of the motor 120 is transmitted to the hydraulic pressure supply unit 110 through the power conversion unit 130, thereby generating hydraulic pressure. At this point, the first and second cut valves 261 and 262 are closed and thus the hydraulic pressure discharged from the master cylinder 20 is not delivered to the wheel cylinders 40.

Also, the first and third inlet valves 221a and 221c, the first to fourth outlet valves 222a, 222b, 222c, and 222d, and the first and second balance valves 241 and 242 are closed, and the hydraulic pressure discharged from the hydraulic pressure supply device 100 is not delivered to right wheels RR and FR among the wheels RL, RR, FL, and FR. Further, the hydraulic pressure discharged from the hydraulic pressure supply device 100 is delivered to the wheel cylinder 40 of the rear left wheel RL through the second inlet valve 221b and to the wheel cylinder 40 of the front left wheel FL through the fourth inlet valve 221d. Consequently, the hydraulic pressure is delivered to only left wheels RL and FL among the wheels RL, RR, FL, and FR.

That is, the electric brake system 2 according to another embodiment of the present disclosure may independently control operations of the first to fourth inlet valves 221a, 221b, 221c, and 221d, the first to fourth outlet valves 222a, 222b, 222c, and 222d, and the first and second balance valves 241 and 242, thereby delivering the hydraulic pressure only to rear wheels RR and RL or only to wheel cylinders 40 that need a required hydraulic pressure among the front right wheel FR and the rear right wheel RR, the front right wheel FR and the rear left wheel RL, or the like.

FIG. 14 is a hydraulic circuit diagram for describing a state in which the electric brake system 2 of another embodiment of the present disclosure operates in a dump mode.

The electric brake system 2 according to another embodiment of the present disclosure may discharge braking pressure provided to only relevant wheel cylinders 40 through the first to fourth outlet valves 222a, 222b, 222c, and 222d.

FIG. 14 shows closed states of the second and fourth inlet valves 221b and 221d, the first and third outlet valves 222a and 222c, and the first and second balance valves 241 and 242 and open states of the first and second inlet valves 221a, 221c, and the second and fourth outlet valves 222b and 222d. Therefore, the hydraulic pressure discharged from the wheel cylinders 40, which are installed at the rear left wheel RL and the front left wheel FL, is delivered to the reservoirs 30 through the second and fourth outlet valves 222b and 222d.

Meanwhile, the second and fourth outlet valves 222b and 222d may be opened to discharge the hydraulic pressure of the relevant wheel cylinders 40, and at the same time the first and third inlet valves 221a and 221c may be opened to supply the hydraulic pressure to the front right wheel FR and the rear right wheel RR.

As described above, each of the valves 221a, 221b, 221c, 221d, 222a, 222b, 222c, 222d, 241, and 242 of the hydraulic control unit 200-1 may be independently controlled to selectively deliver or discharge the hydraulic pressure to or from the wheel cylinder 40 of each of the wheels RL, RR, FL, and FR according to a required pressure such that a precise control of the hydraulic pressure may be possible.

Lastly, a case in which the electric brake system 2 operates abnormally will be described.

FIG. 15 is a hydraulic circuit diagram illustrating a state in which the electric brake system 2 according to another embodiment of the present disclosure operates abnormally.

Referring to FIG. 15, when the electric brake system 2 operates abnormally, each of the valves 221a, 221b, 221c, 221d, 222a, 222b, 222c, 222d, 241, 242, 261, and 262 is provided in an initial state of braking that is a non-operating state. When a driver pressurizes the brake pedal 10, an input rod 12 connected to the brake pedal 10 is moved forward (in a left direction of the drawing), and a first piston 21a which is in contact with the input rod 12 is moved forward (in the left direction of the drawing) at the same time that a second piston 22a is moved forward by means of the first piston 21a. At this point, because there is no gap between the input rod 12 and the first piston 21a, braking may be rapidly performed.

Further, the hydraulic pressure discharged from the master cylinder 20 is delivered to the wheel cylinders 40 through the first and second backup flow paths 251 and 252 that are connected for the purpose of backup braking to realize a braking force. At this point, the first and second cut valves 261 and 262 installed at the first and second backup flow paths 251 and 252 and the first and second balance valves 241 and 242 connected thereto are configured with a normally opened type solenoid valve, and the first to fourth inlet valves 221a, 221b, 221c, and 221d, and the first to fourth outlet valves 222a, 222b, 222c, and 222d are configured with a normally closed type solenoid valve so that the hydraulic pressure is directly delivered to the wheel cylinders 40. Therefore, braking is stably realized to improve braking safety.

As should be apparent from the above description, the electric brake system according to the embodiments of the present disclosure is capable of preventing hydraulic pressure discharged from a master cylinder from leaking in a backup mode by providing a simulation device, which provides a pedal feeling to a driver, at a separate flow path from a backup flow path.

DESCRIPTION OF REFERENCE NUMERALS

10: Brake Pedal
11: Pedal Displacement Sensor
20: Master Cylinder
30: Reservoir
40: Wheel Cylinder
50: Simulation Device
54: First Damping Member
60: Inspection Valve
100: Hydraulic Pressure Supply Device
110: Hydraulic Pressure Supply Unit
120: Motor
130: Power Conversion Unit
200: Hydraulic Control Unit
201: First Hydraulic Circuit
202: Second Hydraulic Circuit
211: First Hydraulic Flow Path
212: Second Hydraulic Flow Path
221: Inlet Valve
222: Outlet Valve
231: First Switching Valve
232: Second Switching Valve
233: Release Valve
241: First Balance Valve
242: Second Balance Valve
251: First Backup Flow Path
252: Second Backup Flow Path
261: First Cut Valve
262: Second Cut Valve

What is claimed is:
1. An electric brake system comprising:
a master cylinder connected to a first reservoir storing oil therein, provided with first and second chambers and first and second pistons respectively provided at the first and second chambers, and configured to discharge oil according to a pedal effort of a brake pedal;
a simulation device configured to provide a reaction force according to the pedal effort of the brake pedal, and provided with a simulation chamber that is connected to the master cylinder and a simulation flow path to accommodate oil therein;
a hydraulic pressure supply device configured to generate hydraulic pressure using a rotational force of a motor that is activated in response to an electrical signal output corresponding to a displacement of the brake pedal; and
a hydraulic control unit configured to deliver the hydraulic pressure delivered from the hydraulic pressure supply device to a wheel cylinder provided at each of wheels, and connected to the first and second chambers of the master cylinder through first and second backup flow paths and connected to the hydraulic pressure supply device through a hydraulic flow path,
wherein hydraulic pressure provided from the master cylinder is selectively delivered to the simulation flow path and the first and second backup flow paths, and
wherein first and second hydraulic ports are formed at the master cylinder to connect the first and second chambers to the first and second backup flow paths, respec- tively, and the simulation flow path is located between the first and second hydraulic ports.

2. The electric brake system of claim 1, further comprising:
a pedal displacement sensor configured to sense the displacement of the brake pedal; and
an electronic control unit (ECU) configured to control the motor and valves on the basis of hydraulic pressure information and displacement information of the brake pedal,
wherein the hydraulic pressure supply device generates the hydraulic pressure using the rotational force of the motor that is activated in response to the electrical signal output from the pedal displacement sensor.

3. The electric brake system of claim 2, wherein the backup flow path is connected to the hydraulic flow path to be connected to the hydraulic control unit,
wherein the electric brake system further includes:
a cut valve provided between the master cylinder and a connection position of one of the first and second backup flow paths and the hydraulic flow path to which the one of the first and second backup flow paths is connected, thereby control a hydraulic pressure flow, and
wherein the cut valve is closed to deliver the hydraulic pressure discharged from the hydraulic pressure supply device to the wheel cylinder in a normal mode, and the cut valve is opened to deliver the hydraulic pressure discharged from the master cylinder to the wheel cylinder in an abnormal mode.

4. The electric brake system of claim 3, further comprising a pressure sensor provided at a connection position of the master cylinder and the backup flow path.

5. The electric brake system of claim 1, wherein the simulation flow path is connected the first chamber, and the oil flows through a gap between an inner wall of the master cylinder and an outer surface of the second piston.

6. The electric brake system of claim 1, wherein the master cylinder includes:
first and second sealing members located in front of and behind the simulation flow path and configured to seal oil of the first chamber and the second chamber,
wherein a depression is formed at the outer surface of the second piston to provide a gap, through which the oil flows, between the first sealing member and the second piston.

7. The electric brake system of claim 1, wherein the hydraulic pressure supply device includes:
a pressure chamber connected to the first reservoir through a hydraulic pressure supply oil flow path to store oil; and
a check valve installed at the hydraulic pressure supply oil flow path and configured to allow oil to flow from the first reservoir to the pressure chamber and to block the oil from flowing from the pressure chamber to the first reservoir.

8. An electric brake system comprising:
a master cylinder connected to a first reservoir storing oil therein, provided with first and second chambers and first and second pistons respectively provided at the first and second chambers, and configured to discharge oil according to a pedal effort of a brake pedal;
a simulation device configured to provide a reaction force according to the pedal effort of the brake pedal, and provided with a simulation chamber that is connected to the master cylinder and a simulation flow path to accommodate oil therein;
a hydraulic pressure supply device configured to generate hydraulic pressure using a rotational force of a motor that is activated in response to an electrical signal output corresponding to a displacement of the brake pedal; and
a hydraulic control unit configured to deliver the hydraulic pressure delivered from the hydraulic pressure supply device to a wheel cylinder provided at each of wheels, and connected to the first and second chambers of the master cylinder through first and second backup flow paths and connected to the hydraulic pressure supply device through a hydraulic flow path,
wherein hydraulic pressure provided from the master cylinder is selectively delivered to the simulation flow path and the first and second backup flow paths,
wherein the simulation device includes:
a simulation block;
a simulation chamber formed at the simulation block and connected to the first chamber through the simulation flow path to store oil;
a reaction force portion installed inside the simulation chamber and configured to provide a reaction force; and
a damping housing provided to support the reaction force portion and to be able to slide inside the simulation block.

9. An electric brake system comprising:
a reservoir configured to store oil;
a master cylinder connected to the reservoir, provided with first and second chambers, first and second pistons respectively provided at the first and second chambers, and first and second hydraulic ports formed to be respectively connected to the first and second chambers, and configured to discharge oil according to a pedal effort of a brake pedal;
a pedal displacement sensor configured to sense a displacement of the brake pedal;
a first backup flow path configured to connect the first hydraulic port to a wheel cylinder;
a second backup flow path configured to connect the second hydraulic port to a wheel cylinder;
a first cut valve provided at the first backup flow path to control an oil flow therein;
a second cut valve provided at the second backup flow path to control an oil flow therein;
a simulation device configured to provide a reaction force according to the pedal effort of the brake pedal and provided with a simulation chamber that is connected to the master cylinder and a simulation flow path to store oil therein;
a hydraulic pressure supply device configured to generate hydraulic pressure using a rotational force of a motor that is activated in response to an electrical signal output from the pedal displacement sensor;
a first hydraulic flow path connected to the hydraulic pressure supply device and connected to the first backup flow path;
a second hydraulic flow path connected to the hydraulic pressure supply device and connected to the second backup flow path;
a hydraulic control unit connected to the first and second hydraulic flow paths, configured to deliver the hydraulic pressure delivered from the hydraulic pressure supply device to a wheel cylinder provided at each of wheels, and provided with first and second hydraulic circuits respectively connected to different wheel cylinders; and an electronic control unit (ECU) configured to control the motor and valves on the basis of hydraulic pressure information and displacement information of the brake pedal, wherein the first cut valve and the second cut valve are closed and the hydraulic pressure generated according to movement of the first piston is delivered to the simulation device through the simulation flow path in a normal mode, and the first cut valve and the second cut valve are opened and the hydraulic pressure generated according to movements of the first piston and the second piston delivered to the wheel cylinder through the first backup flow path and the second backup flow path in an abnormal mode.

10. The electric brake system of claim 9, wherein the master cylinder further includes:

first and second sealing members located in front of and behind the simulation flow path and configured to seal oil of the first chamber and the second chamber, wherein a depression is formed at an outer surface of the second piston to provide a gap, through which the oil flows, between the first sealing member and the second piston, wherein the first sealing member is disposed to be accommodated in the depression formed at the outer surface of the second piston and the oil flows through a gap between an inner wall of the master cylinder and the second piston and through the depression formed at the outer surface of the second piston to be delivered to the simulation flow path in the normal mode, and wherein the first sealing member seals the gap between the inner wall of the master cylinder and the second piston by a forward movement of the second piston in the abnormal mode.

11. The electric brake system of claim 9, wherein the hydraulic control unit further includes:

a first inlet valve, a second inlet valve, a third inlet valve, and a fourth inlet valve which are provided at upstream sides of the wheel cylinders, respectively, to control the hydraulic pressure being delivered to the wheel cylinders provided at the wheels;

a first switching valve configured to control a connection between the hydraulic pressure supply device and the first and second inlet valves and provided at a flow path at which the hydraulic pressure supply device is connected to the first backup flow path; and a second switching valve configured to control a connection between the hydraulic pressure supply device and the third and fourth inlet valves and provided at a flow path at which the hydraulic pressure supply device is connected to the second backup flow path.

12. The electric brake system of claim 9, wherein the hydraulic control unit further includes:

a first inlet valve, a second inlet valve, a third inlet valve, and a fourth inlet valve which are provided at upstream sides of the wheel cylinders, respectively, to control the hydraulic pressure being delivered to the wheel cylinders installed at the wheels;

a first balance valve configured to control a connection between two wheel cylinders connected to the first inlet valve and the second inlet valve, respectively; and a second balance valve configured to control a connection between two wheel cylinders connected to the third inlet valve and the fourth inlet valve, respectively.

* * * * *